US011694725B2

(12) United States Patent
Nakatsuka et al.

(10) Patent No.: US 11,694,725 B2
(45) Date of Patent: *Jul. 4, 2023

(54) INFORMATION PROCESSING APPARATUS AND INFORMATION PROCESSING METHOD

(71) Applicant: SONY GROUP CORPORATION, Tokyo (JP)

(72) Inventors: Shigeo Nakatsuka, Tokyo (JP); Masashi Wakatsuki, Tokyo (JP); Tetsuo Kaneko, Kanagawa (JP)

(73) Assignee: SONY GROUP CORPORATION, Tokyo (JP)

( * ) Notice: Subject to any disclaimer, the term of this patent is extended or adjusted under 35 U.S.C. 154(b) by 19 days.

This patent is subject to a terminal disclaimer.

(21) Appl. No.: 17/403,106

(22) Filed: Aug. 16, 2021

(65) Prior Publication Data

US 2021/0375323 A1 Dec. 2, 2021

Related U.S. Application Data

(63) Continuation of application No. 16/318,470, filed as application No. PCT/JP2018/016326 on Apr. 20, 2018, now Pat. No. 11,114,129.

(30) Foreign Application Priority Data

May 30, 2017 (JP) ................................ 2017-106906

(51) Int. Cl.
*H04N 9/80* (2006.01)
*G11B 27/034* (2006.01)
(Continued)

(52) U.S. Cl.
CPC .......... *G11B 27/034* (2013.01); *G11B 27/036* (2013.01); *G11B 27/34* (2013.01)

(58) Field of Classification Search
USPC .................................................. 386/248, 278
See application file for complete search history.

(56) References Cited

U.S. PATENT DOCUMENTS 6,578,070 B1 6/2003 Weaver et al.
8,624,908 B1 1/2014 Knee et al.
(Continued)

FOREIGN PATENT DOCUMENTS

CN 104822092 A 8/2015
CN 106331824 A 1/2017
(Continued)

OTHER PUBLICATIONS

International Search Report and Written Opinion of PCT Application No. PCT/JP2018/016326, dated Jun. 19, 2018, 05 pages of English Translation and 05 pages of ISRWO.
(Continued)

*Primary Examiner* — Nigar Chowdhury
(74) *Attorney, Agent, or Firm* — Chip Law Group

(57) ABSTRACT

This information processing apparatus includes displaying video content on a first display region in a display section as a first video, displaying the above-mentioned video content on a second display region in the above-mentioned display section as a second video delayed from the above-mentioned first video by a predetermined time, and setting a first tag inputted by a user into the above-mentioned first video and a second tag inputted by the above-mentioned user into the above-mentioned second video as tags for the above-mentioned video content.

19 Claims, 12 Drawing Sheets

(51) Int. Cl.
  *G11B 27/036* (2006.01)
  *G11B 27/34* (2006.01)
  *H04N 5/93* (2006.01)
  *G11B 27/00* (2006.01)

(56) References Cited

U.S. PATENT DOCUMENTS

| | | | |
|---|---|---|---|
| 9,635,307 | B1 | 4/2017 | Mysore et al. |
| 9,761,278 | B1 | 9/2017 | Turley et al. |
| 2005/0125330 | A1* | 6/2005 | Dinwoodie ............ G06Q 30/08 705/37 |
| 2005/0125331 | A1* | 6/2005 | Dinwoodie ............ G06Q 30/08 705/37 |
| 2006/0015925 | A1* | 1/2006 | Logan .................... H04N 21/84 348/E7.071 |
| 2006/0055552 | A1* | 3/2006 | Chung .................... B60R 25/00 340/10.5 |
| 2008/0046956 | A1 | 2/2008 | Kulas |
| 2008/0059170 | A1 | 3/2008 | Bloebaum et al. |
| 2008/0297312 | A1 | 12/2008 | Moshfeghi |
| 2009/0070407 | A1 | 3/2009 | Castle et al. |
| 2009/0097815 | A1 | 4/2009 | Lahr et al. |
| 2009/0103901 | A1 | 4/2009 | Endo et al. |
| 2009/0117928 | A1 | 5/2009 | Ladd et al. |
| 2010/0194979 | A1 | 8/2010 | Blumenschein et al. |
| 2010/0287473 | A1 | 11/2010 | Recesso et al. |
| 2010/0304601 | A1 | 12/2010 | Hsieh |
| 2012/0210217 | A1 | 8/2012 | Abbas et al. |
| 2012/0210383 | A1 | 8/2012 | Sayers et al. |
| 2013/0208124 | A1 | 8/2013 | Boghossian et al. |
| 2013/0242105 | A1 | 9/2013 | Boyle et al. |
| 2014/0010517 | A1 | 1/2014 | Sheffler et al. |
| 2014/0074855 | A1 | 3/2014 | Zhao et al. |
| 2014/0130079 | A1 | 5/2014 | Arora et al. |
| 2014/0157307 | A1 | 6/2014 | Cox |
| 2014/0259181 | A1 | 9/2014 | Wendling et al. |
| 2015/0007032 | A1 | 1/2015 | Brand |
| 2015/0135068 | A1 | 5/2015 | Chiu |
| 2015/0317906 | A1 | 11/2015 | Bosko et al. |
| 2015/0375117 | A1 | 12/2015 | Thompson et al. |
| 2016/0247537 | A1 | 8/2016 | Ricciardi |
| 2016/0309204 | A1 | 10/2016 | Stefanidis et al. |
| 2017/0072321 | A1 | 3/2017 | Thompson et al. |
| 2017/0078767 | A1 | 3/2017 | Borel et al. |
| 2017/0256288 | A1 | 9/2017 | Ai et al. |
| 2017/0262154 | A1 | 9/2017 | Black et al. |
| 2017/0332131 | A1 | 11/2017 | Opsenica et al. |
| 2018/0001206 | A1 | 1/2018 | Osman et al. |
| 2018/0020243 | A1 | 1/2018 | Ni et al. |
| 2018/0021684 | A1 | 1/2018 | Benedetto |
| 2018/0190327 | A1 | 7/2018 | Coward et al. |
| 2018/0199080 | A1 | 7/2018 | Jackson et al. |
| 2019/0361765 | A1 | 11/2019 | Alonso et al. |

FOREIGN PATENT DOCUMENTS

| | | |
|---|---|---|
| CN | 109964275 A | 7/2019 |
| EP | 1892717 A1 | 2/2008 |
| JP | 08-287656 A | 11/1996 |
| JP | 2001-045445 A | 2/2001 |
| JP | 2007-025648 A | 2/2007 |
| WO | 2006/134883 A1 | 12/2006 |

OTHER PUBLICATIONS

Notice of Allowance for U.S. Appl. No. 16/318,470, dated May 4, 2021, 9 pages.

Non-Final Office Action for U.S. Appl. No. 16/318,470, dated Apr. 8, 2020, 11 pages.

Final Office Action for U.S. Appl. No. 16/318,470, dated Sep. 23, 2020, 11 pages.

International Preliminary Report on Patentability of PCT Application No. PCT/JP2018/016326, dated Dec. 12, 2019, 06 pages of English Translation and 03 pages of IPRP.

Office Action for CN Patent Application No. 201880002905.9, dated Sep. 22, 2021, 10 pages of English Translation and 08 pages of Office Action.

Office Action for JP Patent Application No. 2018-558438, dated May 17, 2022, 02 pages of English Translation and 02 pages of Office Action.

* cited by examiner

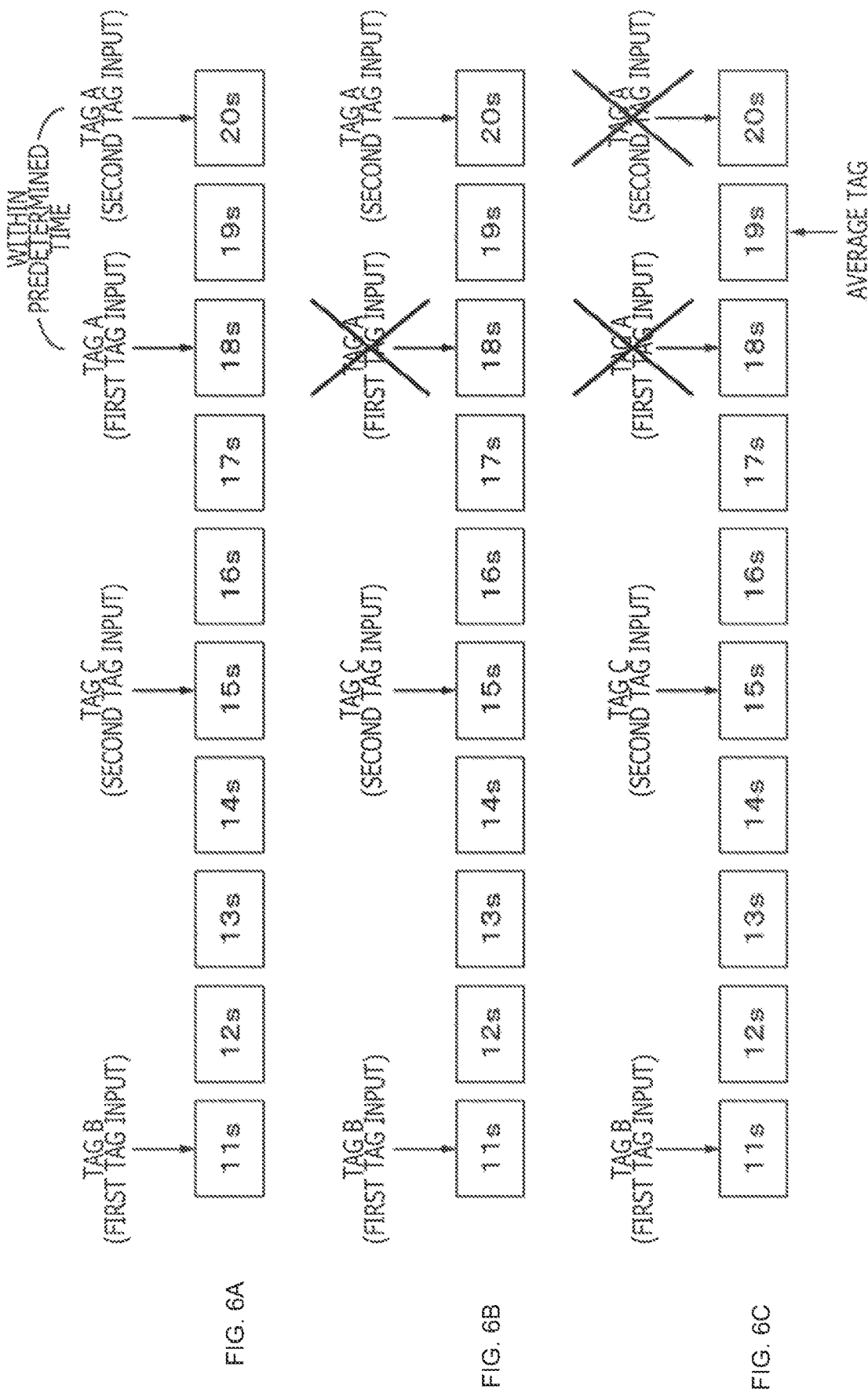

INFORMATION PROCESSING APPARATUS AND INFORMATION PROCESSING METHOD

CROSS-REFERENCES TO RELATED APPLICATIONS

This application is a continuation application of U.S. patent application Ser. No. 16/318,470, filed on Jan. 17, 2019, which is a U.S. National Phase of International Patent Application No. PCT/JP2018/016326 filed on Apr. 20, 2018, which claims priority benefit of Japanese Patent Application No. JP 2017-106906 filed in the Japan Patent Office on May 30, 2017. Each of the above-referenced applications is hereby incorporated herein by reference in its entirety.

TECHNICAL FIELD

The present technology relates to an information processing apparatus, an information processing method, and an information processing program.

BACKGROUND ART

It is an existing practice that marking information called a tag is added to a recorded video, a real-time live video, and so on in order to use as an editing point, a reproduction start position, and the like (refer to PTL 1 below).

CITATION LIST

Patent Literature

[PTL 1]
JP 2016-123083A

SUMMARY

Technical Problems

With a live video, if scenes to be tagged occur continuously, tagging may fail. In tagging a live video, once tagging fails, then, since a video cannot be rewound, a failed scene cannot be tagged immediately thereafter. Retagging takes time because it is required to reproduce a recorded video after the recording of the live video, search for the failed scene, and then tag the found scene.

Therefore, the present technology addresses the above-identified and other problems associated with related-art methods and apparatuses and solves the addressed problems by providing an information processing apparatus, an information processing method, and an information processing program that are configured to easily execute tagging to videos.

Solution to Problems

In carrying out the invention and according to a first aspect thereof, there is provided an information processing apparatus including: displaying video content on a first display region 110 in a display section as a first video, displaying the above-mentioned video content on a second display region 120 in the above-mentioned display section as a second video delayed from the above-mentioned first video by a predetermined time, and setting a first tag inputted by a user into the above-mentioned first video and a second tag inputted by the above-mentioned user into the above-mentioned second video as tags for the above-mentioned video content.

In carrying out the invention and according to a second aspect thereof, there is provided an information processing method. This information processing method includes: displaying video content on a first display region 110 in a display section as a first video, displaying the above-mentioned video content on a second display region 120 in the above-mentioned display section as a second video delayed from the above-mentioned first video by a predetermined time, and setting a first tag inputted by a user into the above-mentioned first video and a second tag inputted by the above-mentioned user into the above-mentioned second video as tags for the above-mentioned video content.

In carrying out the invention and according to a third aspect thereof, there is provided a program for having a computer execute an information processing method. This information processing method includes: displaying video content on a first display region 110 in a display section as a first video, displaying the above-mentioned video content on a second display region 120 in the above-mentioned display section as a second video delayed from the above-mentioned first video by a predetermined time, and setting a first tag inputted by a user into the above-mentioned first video and a second tag inputted by the above-mentioned user into the above-mentioned second video as tags for the above-mentioned video content.

Advantageous Effects of Invention

According to the present technology, tagging to a video can be executed with ease. It should be noted that the effects cited here are not limited thereto. Therefore, any other effects cited in the present description are regarded valid.

BRIEF DESCRIPTION OF DRAWINGS

FIGS. 6A, 6B, and 6C are diagrams describing processing to be executed if there are two tags of the same type in a predetermined interval.

DESCRIPTION OF EMBODIMENTS

Figure 1:
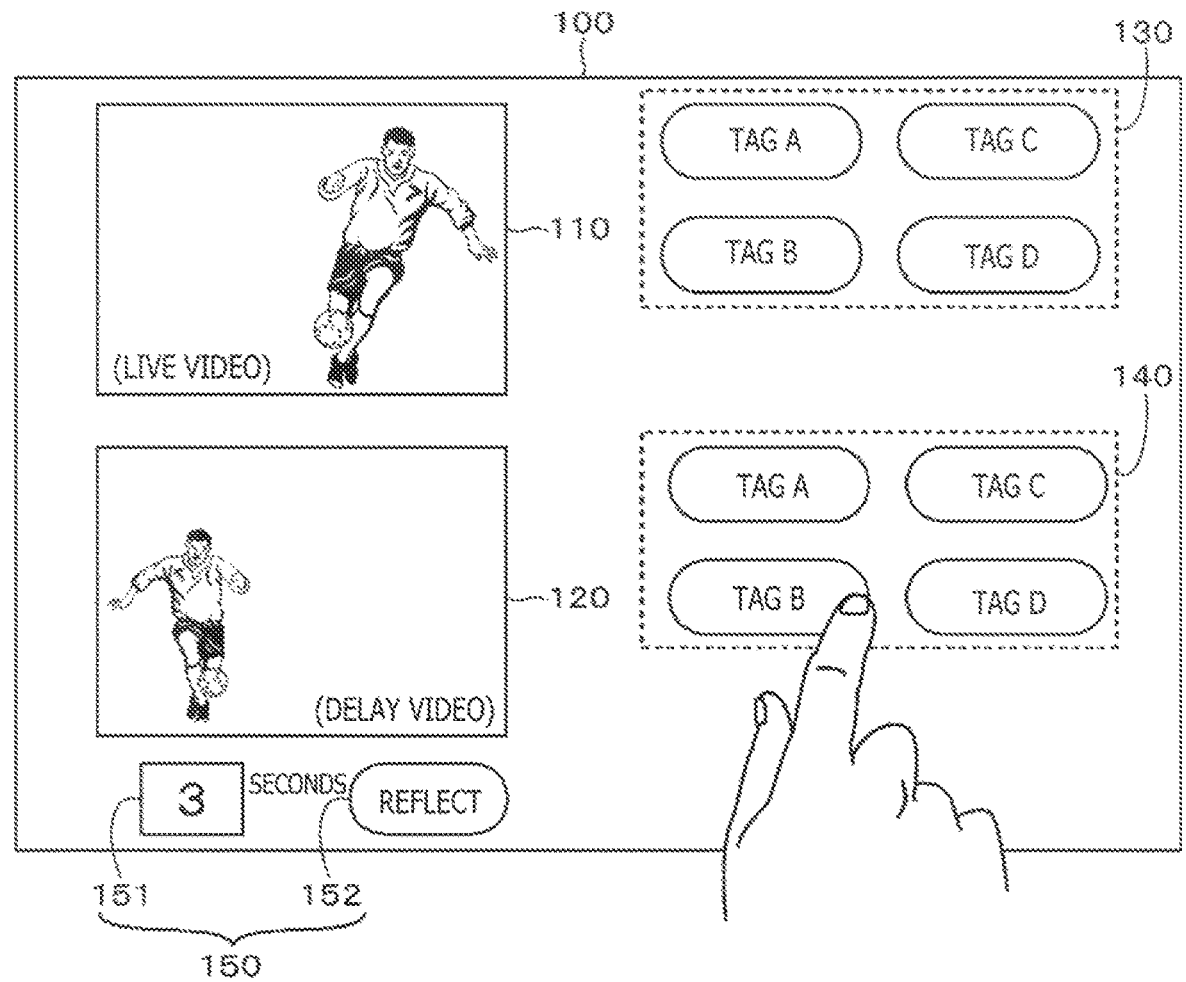
FIG. 1 is a diagram illustrating a configuration of a user interface.

Hereinafter, embodiments of the present technology will be given while referring the drawings. It should be noted that the description will be given in accordance with the following order.
1. Embodiments
1-1. Configuration of user interface
1-2. Configuration of terminal apparatus
1-3. Tagging processing
2. Examples of applications
3. Examples of variations

1. Embodiments 1-1. Configuration of User Interface

An information processing apparatus related with the present technology operates on a terminal apparatus such as a personal computer, a tablet terminal, or a smartphone so as to tag video content sent from an external apparatus such as a video camera with an input done by a user. In the present embodiment, it is assumed that the information processing apparatus operate, as an information processing section 260, on a terminal apparatus 200 having a display section 240 having a function of a touch panel. Further, the present embodiment is described by use of an example in which a live video distributed real-time as video content is tagged.

First, with reference to FIG. 1, a user interface 100 displayed on the display section 240 of the terminal apparatus 200 is described. The user interface 100 has a first display region 110, a second display region 120, a first tag input section 130, a second tag input section 140, and a delay time input section 150.

The first display region 110 displays a real-time live video. The real-time live video is correspond to a first video cited in the scope of claims hereof. The second display region 120 displays a video (hereafter referred to as a delay video) obtained by delaying the same video as the real-time live video displayed in the first display region 110 by a predetermined time. The delay video is correspond to the second video cited in the scope of claims hereof. It should be noted that notations "live video" and "delay video" in FIG. 1 are used for the convenience of description; therefore, these character strings are not actually displayed in the first display region 110 and the second display region 120.

The first tag input section 130 has two or more tag input buttons. The tag input buttons accept tag inputs that are done by a user with a timing of tagging while watching a live video. In the present embodiment, the first tag input section 130 has a total of four tag buttons; tag input button A, tag input button B, tag input button C, and tag input button D, thereby enabling to tag four types of tags corresponding to these tag input buttons to a video. Each of the tags inputted through the first tag input section 130 is correspond to a first tag cited in the scope of claims hereof.

The second tag input section 140 accepts tag inputs that are done by a user with a timing of tagging while watching a delay video displayed in the second display region 120. In the present embodiment, the second tag input section 140 has a total of four tag buttons; tag input button A, tag input button B, tag input button C, and tag input button D as with the first tag input section 130, thereby enabling to tag four types of tags corresponding to these tag input buttons to a video. Each of the tags inputted through the second tag input section 140 is correspond to a second tag cited in the scope of claims hereof.

In the present embodiment, since a display section 240 is a touch panel configured as unitized with an input section 250 in the terminal apparatus 200, an input by a user is executed by touching a finger of the user or a stylus onto corresponding one of the tag input buttons.

The number of tag types, namely, the number of tag input buttons, can be set by the user in advance. For example, if, in a live video of a soccer game, it is required to execute tagging for four scenes of kickoff scene, shoot scene, keeper save scene, and goal getting scene, the user must set the information processing section 260 such that the first tag input section 130 and the second tag input section 140 each have the four tag buttons. For this purpose, an input screen for inputting the number of tags may be displayed on the display section 240 for the user before the displaying of the live video starts.

The delay time input section 150 accepts an input from the user for setting a delay time of a delay video to be displayed on the second display region 120. While accepting the input of a specific delay time (three seconds, five seconds, and so on), the delay time input section 150 has a delay time display section 151 for displaying the inputted delay time and a delay reflection instruction button 152 for inputting an instruction for reflecting the preset delay time onto a video.

The user interface 100 is configured as described above.

Figure 2:
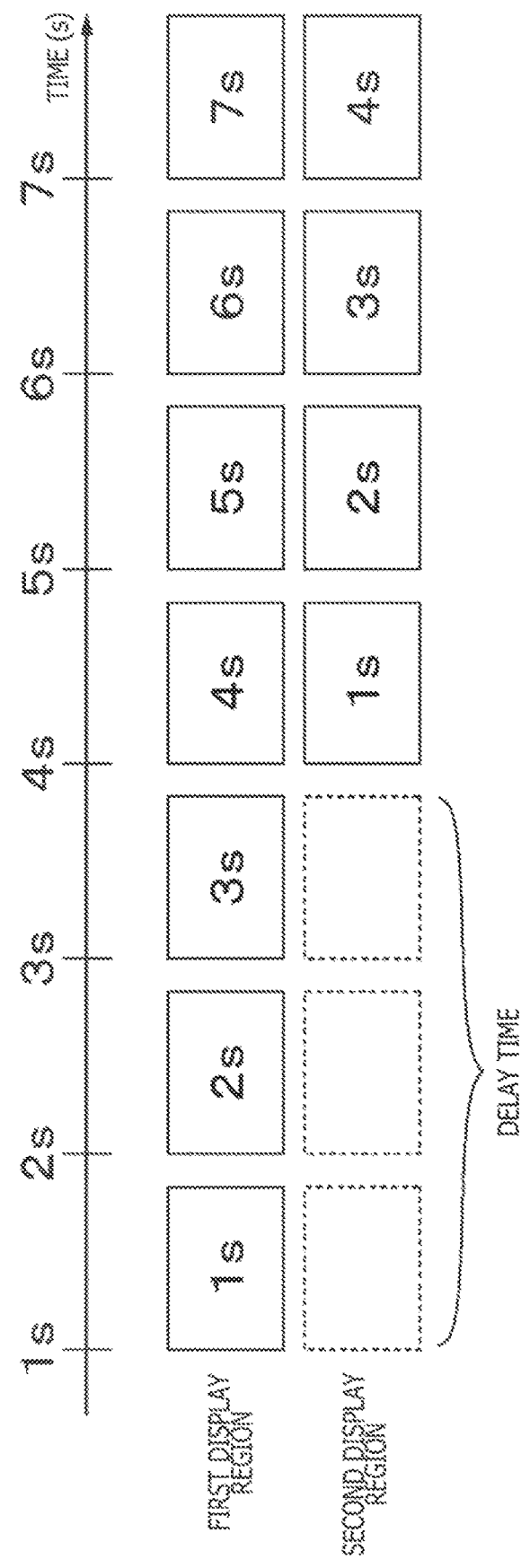
FIG. 2 is a diagram describing video displays in a first display region and a second display region.

As illustrated in FIG. 2, the first display region 110 displays in real time a live video as video content and the second display region 120 displays this live video as delayed by a predetermined delay time (three seconds in the example illustrated in FIG. 2). Therefore, while watching the real-time live video displayed on the first display region 110 and executing tag input, the user can execute tag input by watching the delay video displayed on the second display region 120 if the tag input is failed or the tag input is to be redone.

1-2. Configuration of Terminal Apparatus

Figure 3:
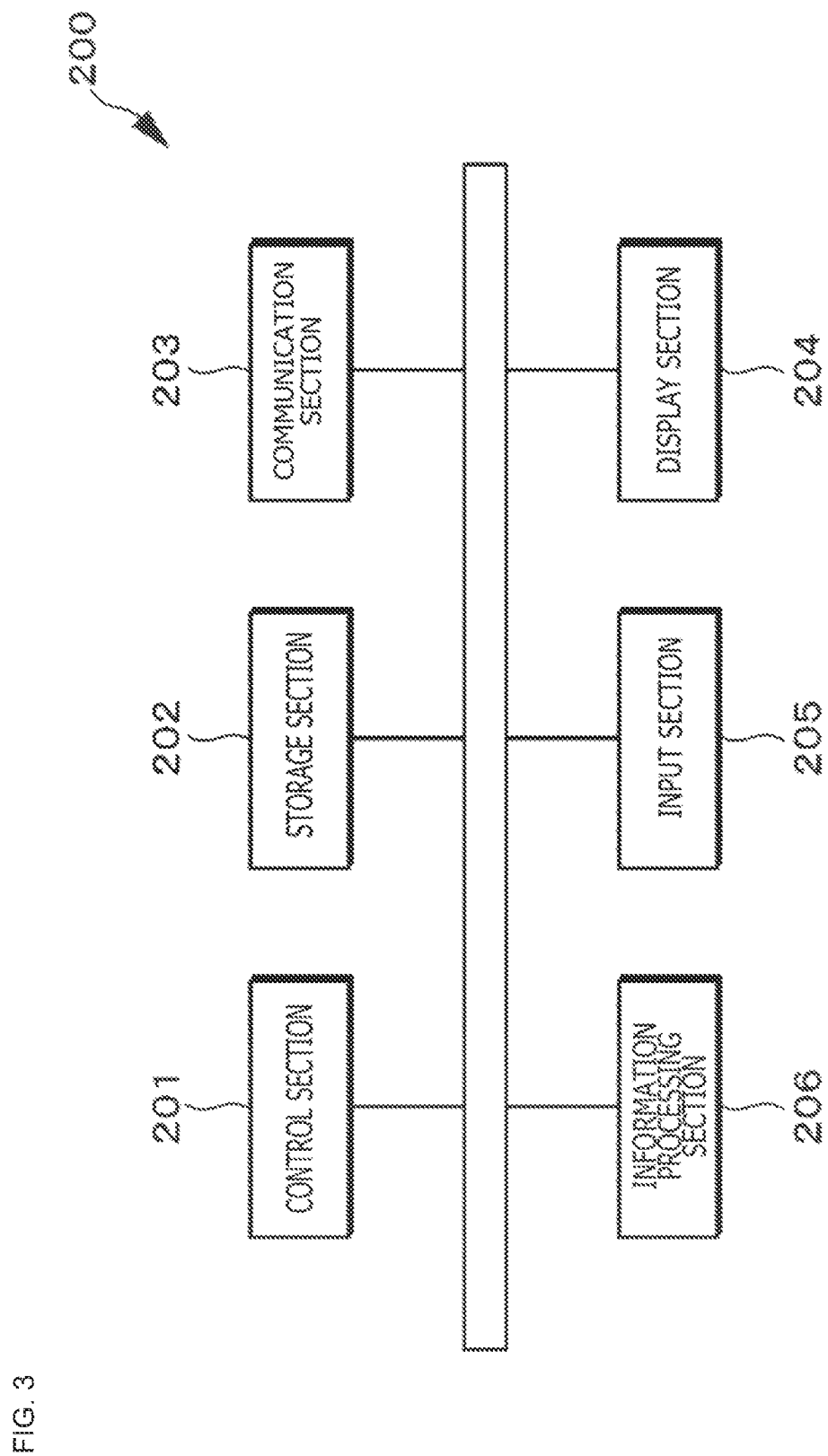
FIG. 3 is a block diagram illustrating a configuration of a terminal apparatus.

Now, referring to FIG. 3, the description of the terminal apparatus 200 is done below. The terminal apparatus 200 has a control section 210, a storage section 220, a communication section 230, a display section 240, an input section 250, and an information processing section 260.

The control section 210 includes a CPU (Central Processing Unit), a RAM (Random Access Memory), and a ROM (Read Only Memory). The ROM stores a program and so on read and operated by the CPU. The RAM is also used as a work memory of the CPU. The CPU executes control on the entire terminal apparatus 200 by issuing commands by executing various types of processing as instructed by the program stored in the ROM.

The storage section 220 is a mass storage medium such as a hard disc drive, an SD memory card, and so on, for example. The storage section 220 is capable of storing content such as images, videos, and document files and applications. Further, the storage section 220 can also be used to store video files, tag information, and so on generated by executing predetermined processing on video signals inputted in the terminal apparatus.

The communication section 230 is a communication module, a communication connector, and so on for executing communication with external apparatuses, the Internet, and so on. The communication based on the communication section 230 may be wired communication such as USB communication or wireless communication such as wireless LAN like Wi-Fi, Bluetooth (registered trademark), ZigBee (registered trade mark), 4G (the fourth-generation mobile communication system), broad band, and so on. A video signal supplied from an external apparatus such as a camera recording video content by recording is received by the communication section 230.

The display section 240 is a display device including an LCD (Liquid Crystal Display), a PDP (Plasma Display Panel), or an organic EL (Electro Luminescence) panel, for example. The display section 240 displays a user interface of the terminal apparatus 200, the content such as images, videos, and document files stored in the storage section 220, and the user interface 100 for tagging related with the present technology described with reference to FIG. 1.

The input section 250 accepts the input of an operation done on the terminal apparatus 200 by the user. When an input is done into the input section 250 by the user, a control signal corresponding to this input is generated to be outputted to the control section 210. Then, the control section 210 executes an arithmetic operation and the control of the terminal apparatus 200 corresponding to this control signal. The input section 250 is realized by a pointing device called a touch panel integrated with the display section 240, a track pad or a touch pad, operated by a finger of the user on a planar sensor not integrated with the display section 240, a keyboard, and a mouse. In the present embodiment, the display section 240 is a touch panel configured as integrated with the input section 250 with which the user executes an input operation by touching a finger or a stylus onto the display section 240.

Figure 4:
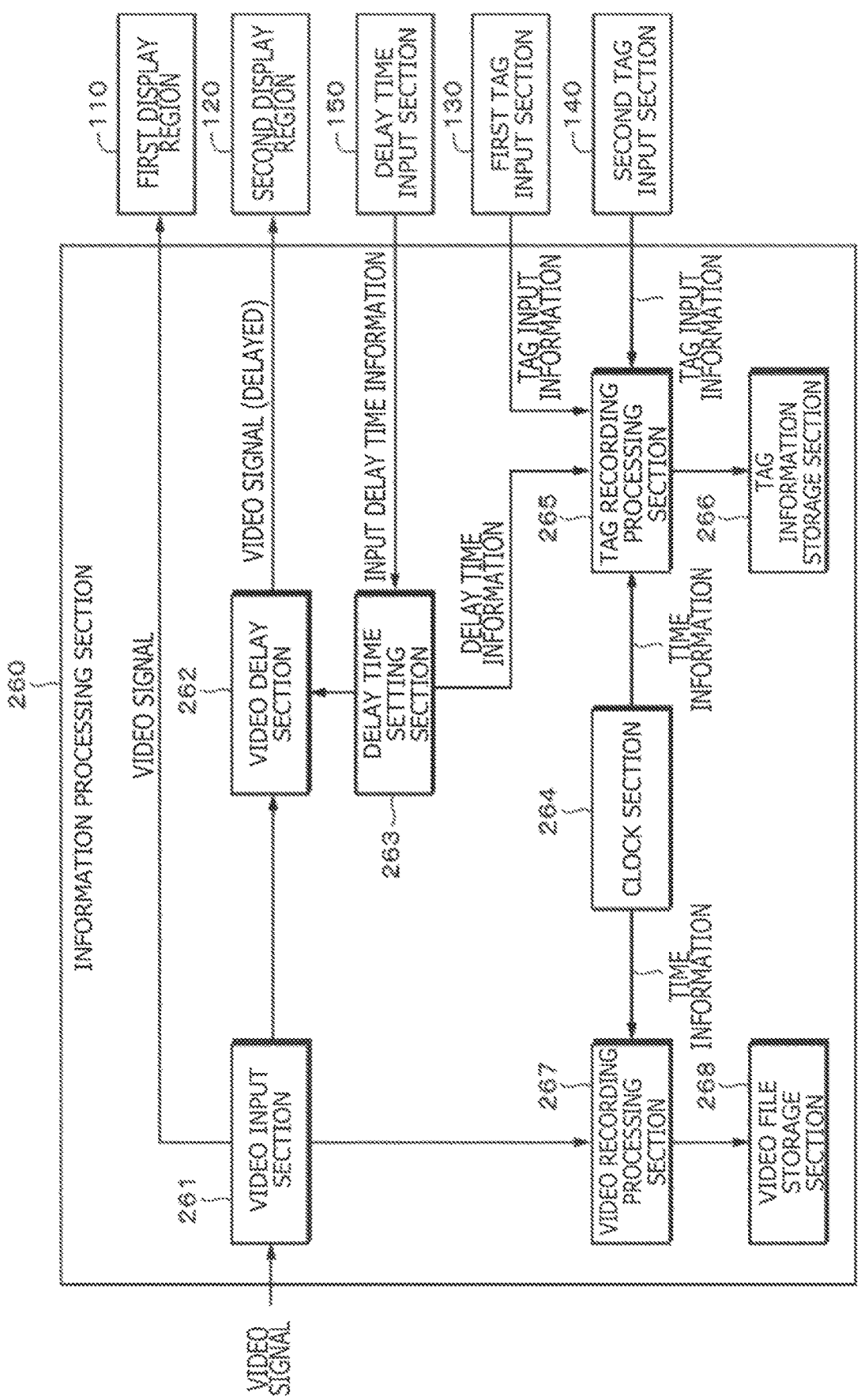
FIG. 4 is a block diagram illustrating a configuration of an information processing section.

The information processing section 260 executes the processing of tagging a video on the basis of the input done by the user by displaying the user interface 100 on the display section 240. Details of the information processing section 260 are illustrated in FIG. 4.

The information processing section 260 includes a video input section 261, a video delay section 262, a delay time setting section 263, a clock section 264, a tag recording processing section 265, a tag information storage section 266, a video recording processing section 267, and a video file storage section 268.

A video signal sent from an external apparatus to the terminal apparatus 200 is supplied to the video input section 261 and then the video signal is supplied from the video input section 261 to the first display region 110 in the display section 240, thereby displaying the real-time live video on the first display region 110.

Further, a video signal is supplied from the video input section 261 to the video delay section 262. The video delay section 262 is a buffer that temporally holds the video signal. The time in which the video delay section 262 holds the video signal is supplied from the delay time setting section 263.

The delay time setting section 263 sets a delay time upon receiving a delay time input by the user through the delay time input section 150 and supplies the information regarding this delay time to the video delay section 262 and the tag recording processing section 265. The video delay section 262 holds the video signal for a time indicated by the delay time information and supplies the video signal to the second display region 120 upon passing of the delay time. Consequently, the second display region 120 in the display section 240 displays a delay video delayed from the real-time live video by the delay time displayed in the first display region 110. The delay time may be approximately three to five seconds, for example.

The clock section 264 clocks a time indicative of the degree of progression of video content and supplies the information regarding the clocked time to the tag recording processing section 265. It should be noted that the time information may be elapsed time from the time at which video content starts or an actual time. Further, if the time information is attached to a video signal in advance, then the clock section 264 is not required, so that the time information attached to that video signal may be used.

The tag recording processing section 265 receives the tag input information supplied from the first tag input section 130 and the second tag input section 140 and relates the tag with the time information, thereby storing the related tag and time information in the tag information storage section 266.

It should be noted that it is required beforehand to set the number of types (the number of tag input buttons) of the tag to be inputted to the tag recording processing section 265. As described above, the number of types "4" of the tags inputted by the user for tagging the kickoff scene, the shoot scene, the keeper save scene, and goal getting scene in a live video of a soccer game, for example, is set to the tag recording processing section 265.

Then, in accordance with the preset number of tag types, the terminal apparatus 200 makes the first tag input section 130 and the second tag input section 140 of the display section 240 display the tag input buttons. It should be noted that, basically, the number of tag input buttons of the first tag input section 130 and the number of input tag buttons in the second tag input section 140 are the identical.

When an input operation is done by the user into the first tag input section 130, the tag input information is supplied from the first tag input section 130 to the tag recording processing section 265. The tag recording processing section 265 relates the tag information supplied from the first tag input section 130 with the time information supplied from the clock section 264 and stores the related tag information and time information into the tag information storage section 266 as the tag information of the video content. It should be noted that the tag information storage section 266 may be configured by use of the storage section 220.

Further, when an input operation is done by the user into the second tag input section 140, tag information is supplied from the second tag input section 140 to the tag recording processing section 265. The tag recording processing section 265 relates the tag information supplied from the second tag input section 140 with a time obtained by subtracting a delay time indicated in the delay time information from a time indicated in the time information supplied from the clock section 264 and stores the related information and time into the tag information storage section 266 as the tag information of the video content. Since the tag inputted through the second tag input section 140 is a tag inputted by the user while watching the video delayed from a real-time live video, this tag is delayed from the real-time live video by the delay time. Therefore, correcting the time information to be related with the tag inputted through the second tag input section 140 as described above provides a tag of which tag information inputted through the second tag input section 140 corresponds to a correct time.

The video recording processing section 267 executes predetermined video file generation processing on a video signal supplied from the video input section 261 so as to generate a video file, thereby storing the generated video file into the video file storage section 268 by relating time information with each of the frames making up this video file. The video file storage section 268 may be configured by use of the storage section 220.

It should be noted that the information processing section 260 may be configured by a program that may be installed in the terminal apparatus 200 in advance or by the user after distribution by downloading or in a recording medium. Further, the control section 210 may take the function of the information processing section 260 or the information processing section 260 may be independent of the control section 210 in configuration. Still further, the information processing section 260 may be realized not only by a program but also a combination of dedicated hardware apparatus and circuit that have the function of the information processing section 260.

The terminal apparatus 200 is configured as described above.

1-3. Tagging Processing

Figure 5:
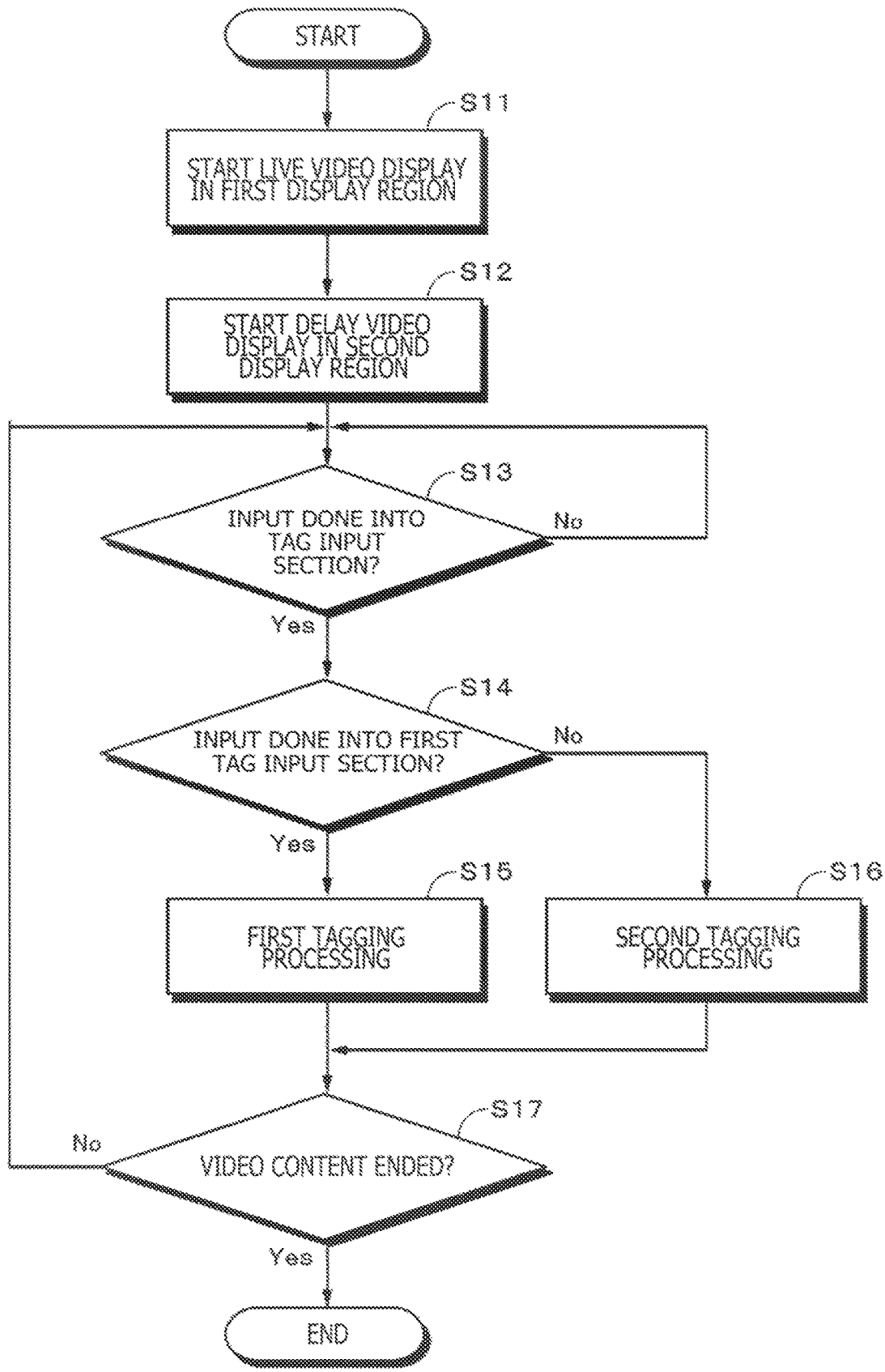
FIG. 5 is a flowchart indicative of a flow of tagging processing.

The following describes a flow of the video content tagging processing to be executed by the information processing section 260 with reference to the flowchart illustrated in FIG. 5. First, in step S11, video content is displayed in the first display region 110 as a real-time live video. Next, in the step S12, a delay video obtained by delaying the video content by a delay time is displayed in the second display region 120.

Next, in step S13, it is determined whether an input operation has been done by the user into the first tag input section 130 or the second tag input section 140. If no tag input by the user is found, the decision in step S13 is repeated until a tag is inputted (No in step S13). If a tag input by the user is found, then the processing goes to step S14 (Yes in step S13).

It is determined in step S14 whether the tag input by the user is into the first tag input section 130 or not; if the tag input is found to be input into the first tag input section 130, then the processing goes to step S15 (Yes in step S14). Then, in step S15, registration processing is executed on the tag inputted in the first tag input section 130 for the real-time live video.

If, in step S14, the tag input by the user is not found into the first tag input section 130, then, the processing goes to step S16 (No in step S14). That the tag input by the user is not into the first tag input section 130 means that this tag input is into the second tag input section 140, so that the registration processing of the tag inputted in the second tag input section 140 is executed from the delay video in step S16.

It should be noted that the processing in step S14 is not limited to the decision whether the tag input by the user is into the first tag input section 130, so that this processing may be the decision whether the tag input is into the second tag input section 140. That is, any processing may be executed if the decision whether the input is into the first tag input section 130 or the second tag input section 140.

Next, in step S17, it is determined whether the video content has ended or not. This may be determined by whether the supply of the video signal to the information processing section 260 has stopped for a predetermined duration of time or a signal indicative of the end of the video content has been supplied along with the video signal, for example.

If the video content is found to have ended, the tagging processing by the information processing section 260 ends. On the other hand, if the video content is found to have not ended, then the processing goes to step S13 so as to repeat the processing operations in step S13 through step S17 until the tagging processing on the video content ends. The tagging processing on the video content is executed as described above.

The following describes the case in which the tags of the same type inputted by the first tag input section 130 and the second tag input section 140 are within a predetermined time range with reference to FIGS. 6A, 6B, and 6C. FIGS. 6A, 6B, and 6C are indicative that time and video content progress from left to right, indicating videos for one second each, 11 seconds through 20 seconds from the start of the video content, for the convenience of description.

As illustrated in FIG. 6A, the case is assumed in which a tag set to video content by an input into the first tag input section 130 for a live video ("first tag input" in FIGS. 6A, 6B, and 6C) and a tag set to video content by an input into the second tag input section 140 for a delay video ("second tag input" in FIGS. 6A, 6B, and 6C) be of the same type and these tags be within a predetermined time range. In FIGS. 6A, 6B, and 6C tag A by the first tag input and tag A by the second tag input are of the same type and are within a predetermined time range.

In this case, as illustrated in FIG. 6B, the tag (the second tag input) inputted by the second tag input section 140 for the delay video may be prioritized and the tag (the first tag input) inputted by the first tag input section 130 for the live video may be deleted. In FIGS. 6A, 6B, and 6C, since there are tag A inputted by the first tag input section 130 and tag A inputted by the second tag input section 140 within a predetermined interval, tag A inputted by the second tag input section 140 is prioritized and tag A inputted by the first tag input section 130 is deleted. This is because the tag inputted by the user while watching the live video shifted from a desired timing, it is considered that the tag was inputted again with a desired timing while watching the delay video.

Further, as illustrated in FIG. 6C, an average of the time information of each of the tags inputted from the first tag input section 130 for a live video and inputted from the second tag input section 140 for a delay video may be computed so as to create one new tag ("average tag" in FIG. 6C) corresponding to the computed average time. It should be noted that the predetermined time range may be set to the information processing section 260 in advance or in accordance with the input done by the user.

The tagging processing in the present technology is executed as described above. According to the present technology, the user executes tag input while watching the first video displayed in the first display region 110 and, if there is a shift in tag input timing or tag input is forgotten, the user may redo the tag input with a correct timing while watching the second video delayed from the first video displayed in the second display region 120. Therefore, also in executing tag input into a real-time live video, the user need not execute fast rewind of a recorded live video so as to wait a live video to end in order to redo the tag input.

Further, according to the present technology, it is easy to tag a scene that is highly possible to continuously occur in a time sequence. For example, assume the case in which tagging is executed on a keeper save scene immediately after a shoot scene or on a goal getting scene in a soccer game. In tagging only by a real-time live video, it is required to execute the tag input of a keeper save scene or a goal getting scene immediately after the execution of the tag input of a shoot scene. If the keeper saves every time, there is no problem; actually, however, getting a goal is possible, thereby making it hard to execute tag input while determining the possibility of getting a goal. Therefore, by use of the present technology, tag input can be executed on a shoot scene while checking a real-time live video so as to execute tag input into keeper save or goal getting while checking a delay video, thereby allowing the user to execute tagging with enough time.

In addition, it is also practicable to allocate different tags to a real-time live video and a delay video. For example, in tagging a video in which a soccer game is fought between team A and team B, executing tagging of team A for a real-time live video and tagging of team B for a delay video facilitates the tagging for these two teams. As described above, tagging may be made easier than the tagging executed by use of only one video.

Figure 7A:
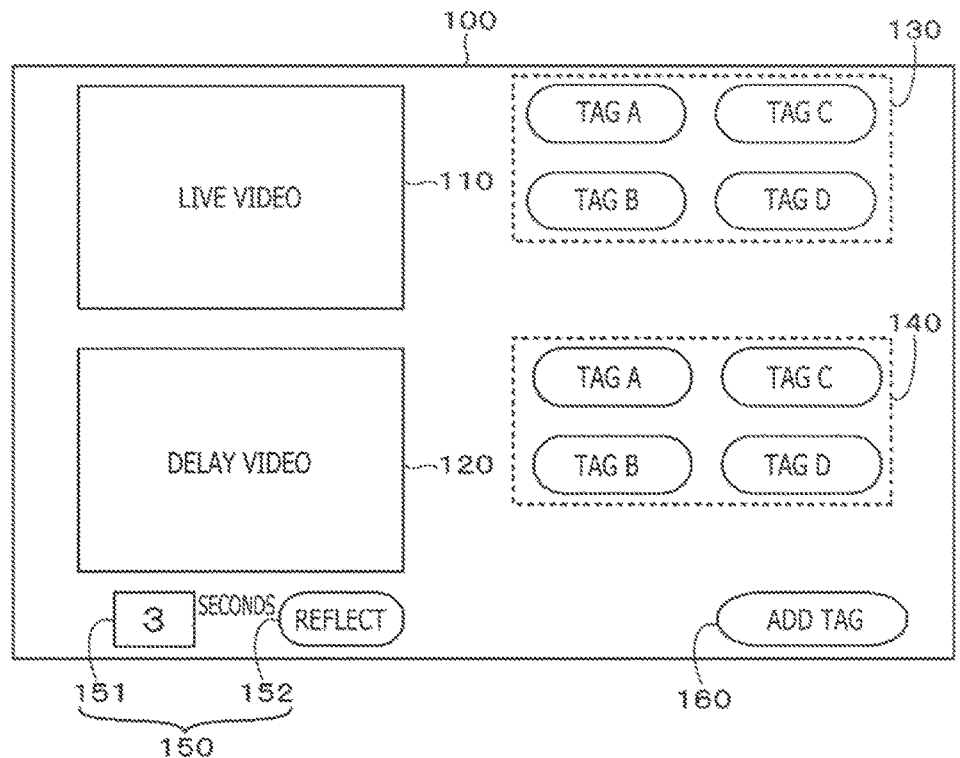
FIGS. 7A and 7B are diagrams illustrating a configuration of a user interface having a tag add button.
Figure 7B:
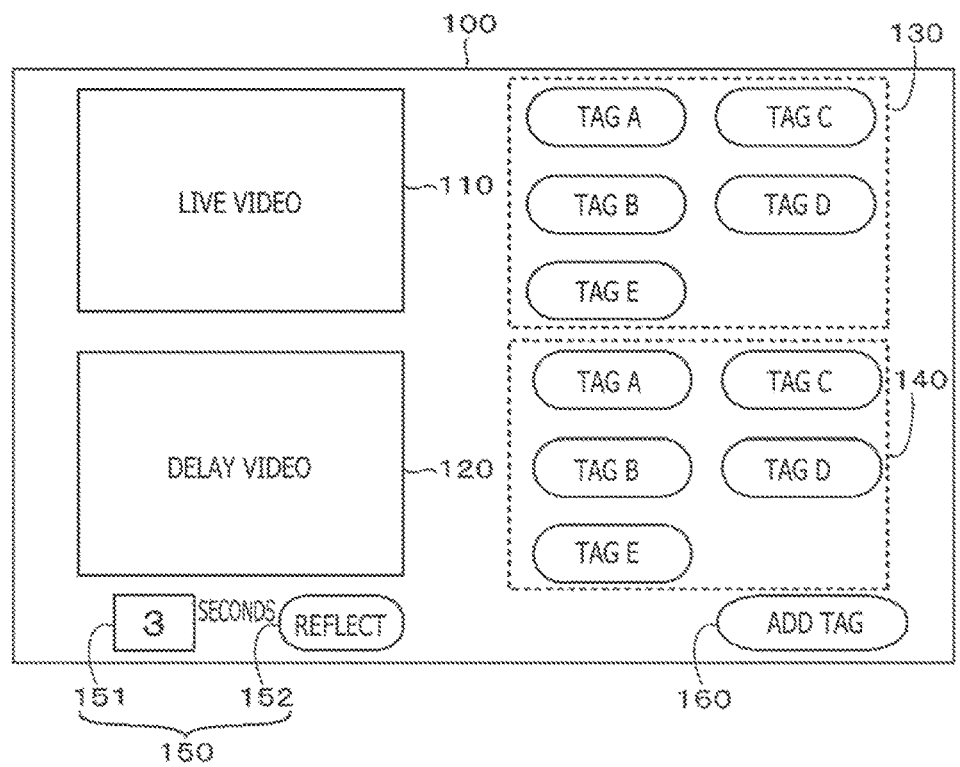

In the description of embodiments, it is assumed that the number of tag input buttons, namely, the number of tag types be four; however, the number of tag types is not limited thereto. As described above, the number of tag input buttons, namely, the number of tag types may be set to any number. In addition, as depicted in FIG. 7A, if a tag add button 160 is arranged to the user interface 100 and input is executed through the tag add button 160 after the start of the reproduction of video content, a tag input button may be added as illustrated in FIG. 7B. In FIG. 7B, a tag input button E is newly added.

It should be noted that, if there are two or more tag types, then the relation between tags may be set. For example, assume that, in a soccer game, the tagging be executed on four scenes of a game start scene, a shoot scene, a keeper save scene, and a goal getting scene. It is also assumed that the first tag button be a game start scene, the second tag input button be a shoot scene, the third tag input button be a keeper save scene, and the fourth tag input button be a goal getting scene.

In an ordinary soccer game, since it is highly possible that a shoot scene is followed by a keeper save scene or a goal getting scene, the relation between the second tag button corresponding to a shoot scene, the third tag input button corresponding to a keeper save scene, and the fourth tag input button corresponding to a goal getting scene is set in advance. Then, since it is highly possible that, when the user input has been executed on the second tag input button, the user input is executed on the third tag input button and then the fourth tag input button, the third tag input button and the fourth tag input button are displayed in a highlighted manner. For the highlighted display, any methods allowing the user recognition, such as blinking, enclosing with thick frame, or enlarged display, may be used.

This setting of the tag relation may be executed by the information processing section 260 in accordance with the input from the user into the terminal apparatus 200. Also, the regularity of tagging may be determined from the past video and the tags attached thereto accumulated in a database or the like, thereby obtaining the relation from the determined regularity.

2. Examples of Applications

The technology according to the present disclosure can be applied to various products. For example, the technology according to the present disclosure may be applied to a surgery room system.

Figure 8:
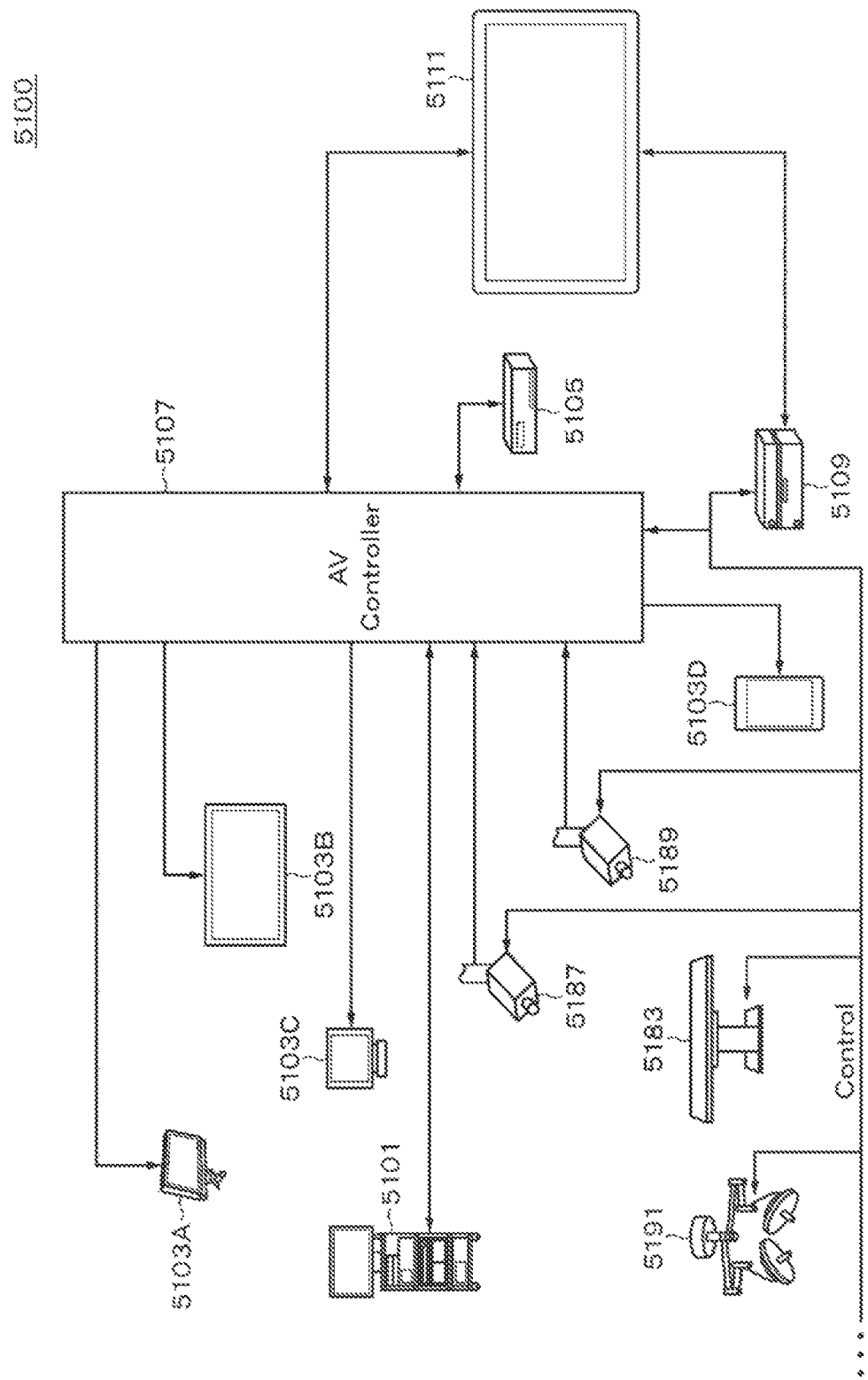
FIG. 8 is a view schematically depicting a general configuration of a surgery room system.

FIG. 8 is a view schematically depicting a general configuration of a surgery room system 5100 to which the technology according to an embodiment of the present disclosure can be applied. Referring to FIG. 8, the surgery room system 5100 is configured such that a group of apparatus installed in a surgery room are connected for cooperation with each other through an audiovisual (AV) controller 5107 and a surgery room controlling apparatus 5109.

In the surgery room, various apparatus may be installed. In FIG. 8, as an example, various apparatus group 5101 for endoscopic surgery, a ceiling camera 5187, a surgery field camera 5189, a plurality of display apparatus 5103A to 5103D, a recorder 5105, a patient bed 5183 and an illumination 5191 are depicted. The ceiling camera 5187 is provided on the ceiling of a surgery room and images the hands of a surgeon. The surgery field camera 5189 is provided on the ceiling of the surgery room and images a state of the entire surgery room.

Among the apparatus mentioned, the apparatus group 5101 belongs to an endoscopic surgery system 5113 hereinafter described and include an endoscope, a display apparatus which displays an image picked up by the endoscope and so forth. Various apparatus belonging to the endoscopic surgery system 5113 are referred to also as medical equipment. Meanwhile, the display apparatus 5103A to 5103D, the recorder 5105, the patient bed 5183 and the illumination 5191 are apparatus which are equipped, for example, in the surgery room separately from the endoscopic surgery system 5113. The apparatus which do not belong to the endoscopic surgery system 5113 are referred to also as non-medical equipment. The audiovisual controller 5107 and/or the surgery room controlling apparatus 5109 cooperatively control operation of the medical equipment and the non-medical equipment with each other.

The audiovisual controller 5107 integrally controls processes of the medical equipment and the non-medical equipment relating to image display. Specifically, each of the apparatus group 5101, the ceiling camera 5187 and the surgery field camera 5189 from among the apparatus provided in the surgery room system 5100 may be an apparatus having a function of sending information to be displayed during surgery (such information is hereinafter referred to as display information, and the apparatus mentioned is hereinafter referred to as apparatus of a sending source). Meanwhile, each of the display apparatus 5103A to 5103D may be an apparatus to which display information is outputted (the apparatus is hereinafter referred to also as apparatus of an output destination). Further, the recorder 5105 may be an apparatus which serves as both of an apparatus of a sending source and an apparatus of an output destination. The audiovisual controller 5107 has a function of controlling operation of an apparatus of a sending source and an apparatus of an output destination to acquire display information from the apparatus of a sending source and transmit the display information to the apparatus of an output destination so as to be displayed or recorded. It is to be noted that the display information includes various images picked up during surgery, various kinds of information relating to the surgery (for example, physical information of a patient, inspection results in the past or information regarding a surgical procedure) and so forth.

Specifically, to the audiovisual controller 5107, information relating to an image of a surgical region in a body lumen of a patient imaged by the endoscope may be transmitted as the display information from the apparatus group 5101. Further, from the ceiling camera 5187, information relating to an image of the hands of the surgeon picked up by the ceiling camera 5187 may be transmitted as display information. Further, from the surgery field camera 5189, information relating to an image picked up by the surgery field camera 5189 and illustrating a state of the entire surgery room may be transmitted as display information. It is to be noted that, if a different apparatus having an image pickup function exists in the surgery room system 5100, then the audiovisual controller 5107 may acquire information relating to an image picked up by the different apparatus as display information also from the different apparatus.

Alternatively, for example, in the recorder 5105, information relating to such images as mentioned above picked up in the past is recorded by the audiovisual controller 5107. The audiovisual controller 5107 can acquire, as display information, information relating to the images picked up in the past from the recorder 5105. It is to be noted that also various pieces of information relating to surgery may be recorded in advance in the recorder 5105.

The audiovisual controller 5107 controls at least one of the display apparatus 5103A to 5103D, which are apparatus of an output destination, to display acquired display information (namely, images picked up during surgery or various pieces of information relating to the surgery). In the example depicted, the display apparatus 5103A is a display apparatus installed so as to be suspended from the ceiling of the surgery room; the display apparatus 5103B is a display apparatus installed on a wall face of the surgery room; the display apparatus 5103C is a display apparatus installed on a desk in the surgery room; and the display apparatus 5103D is a mobile apparatus (for example, a tablet personal computer (PC)) having a display function.

Further, though not depicted in FIG. 8, the surgery room system 5100 may include an apparatus outside the surgery room. The apparatus outside the surgery room may be, for example, a server connected to a network constructed inside and outside the hospital, a PC used by medical staff, a projector installed in a meeting room of the hospital or the like. Where such an external apparatus is located outside the hospital, also it is possible for the audiovisual controller 5107 to cause display information to be displayed on a display apparatus of a different hospital through a teleconferencing system or the like to perform telemedicine.

The surgery room controlling apparatus 5109 integrally controls processes other than processes relating to image display on the non-medical equipment. For example, the surgery room controlling apparatus 5109 controls driving of the patient bed 5183, the ceiling camera 5187, the surgery field camera 5189 and the illumination 5191.

In the surgery room system 5100, a centralized operation panel 5111 is provided such that it is possible to issue an instruction regarding image display to the audiovisual controller 5107 or issue an instruction regarding operation of the non-medical equipment to the surgery room controlling apparatus 5109 through the centralized operation panel 5111. The centralized operation panel 5111 is configured by providing a touch panel on a display face of a display apparatus.

Figure 9:
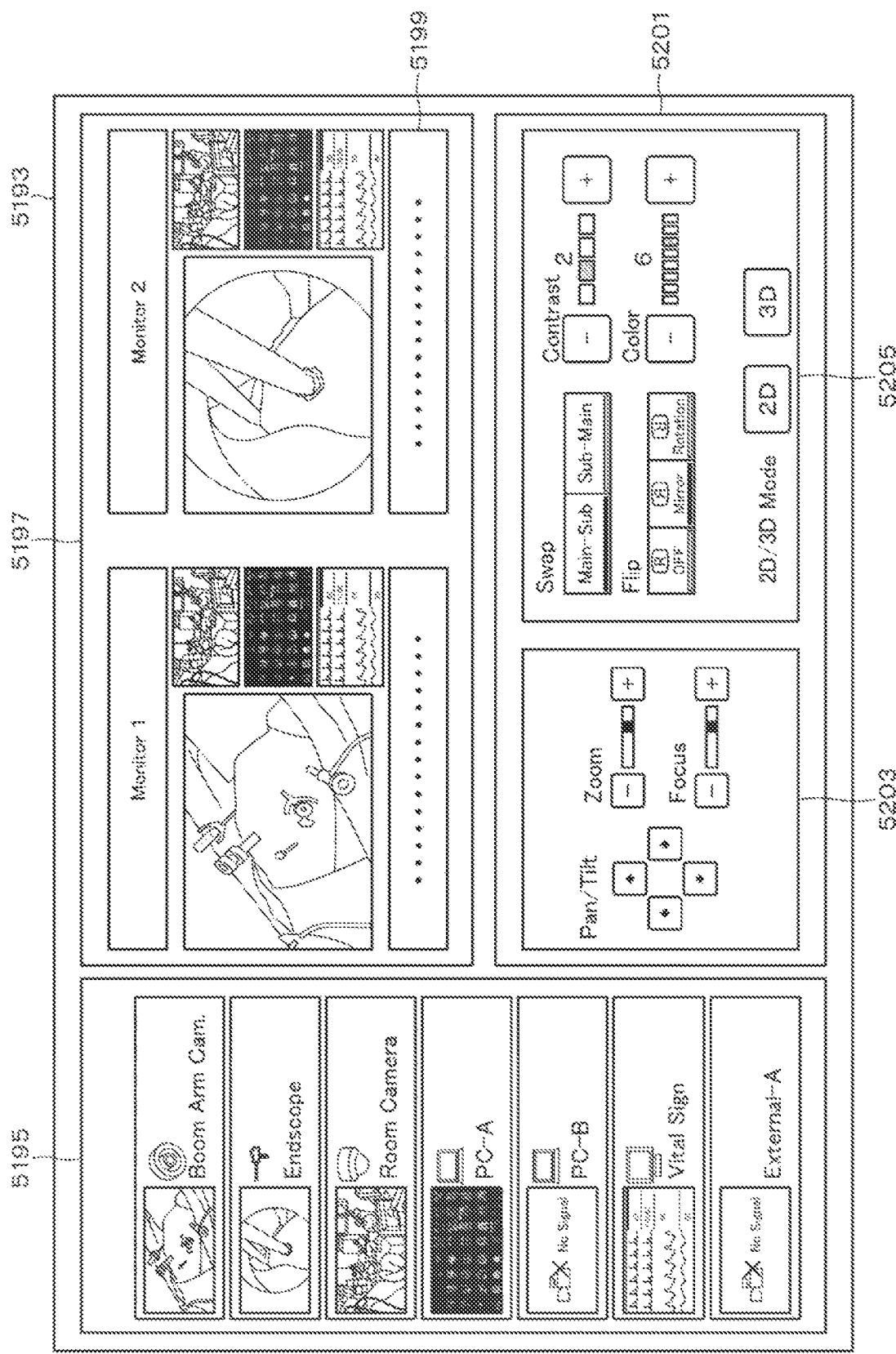
FIG. 9 is a view depicting an example of display of an operation screen image of a centralized operation panel.

FIG. 9 is a view depicting an example of display of an operation screen image on the centralized operation panel 5111. In FIG. 9, as an example, an operation screen image is depicted which corresponds to a case in which two display apparatus are provided as apparatus of an output destination in the surgery room system 5100. Referring to FIG. 9, the operation screen image 5193 includes a sending source selection region 5195, a preview region 5197 and a control region 5201.

In the sending source selection region 5195, the sending source apparatus provided in the surgery room system 5100 and thumbnail screen images representative of display information the sending source apparatus have are displayed in an associated manner with each other. A user can select display information to be displayed on the display apparatus from any of the sending source apparatus displayed in the sending source selection region 5195.

In the preview region 5197, a preview of screen images displayed on two display apparatus (Monitor 1 and Monitor 2) which are apparatus of an output destination is displayed. In the example depicted, four images are displayed by picture in picture (PinP) display in regard to one display apparatus. The four images correspond to display information sent from the sending source apparatus selected in the sending source selection region 5195. One of the four images is displayed in a comparatively large size as a main image while the remaining three images are displayed in a comparatively small size as sub images. The user can exchange between the main image and the sub images by suitably selecting one of the images from among the four images displayed in the region. Further, a status displaying region 5199 is provided below the region in which the four images are displayed, and a status relating to surgery (for example, elapsed time of the surgery, physical information of the patient and so forth) may be displayed suitably in the status displaying region 5199.

A sending source operation region 5203 and an output destination operation region 5205 are provided in the control region 5201. In the sending source operation region 5203, a graphical user interface (GUI) part for performing an operation for an apparatus of a sending source is displayed. In the output destination operation region 5205, a GUI part for performing an operation for an apparatus of an output destination is displayed. In the example depicted, GUI parts for performing various operations for a camera (panning, tilting and zooming) in an apparatus of a sending source having an image pickup function are provided in the sending source operation region 5203. The user can control operation of the camera of an apparatus of a sending source by suitably selecting any of the GUI parts. It is to be noted that, though not depicted, where the apparatus of a sending source selected in the sending source selection region 5195 is a recorder (namely, where an image recorded in the recorder in the past is displayed in the preview region 5197), GUI parts for performing such operations as reproduction of the image, stopping of reproduction, rewinding, fast-feeding and so forth may be provided in the sending source operation region 5203.

Further, in the output destination operation region 5205, GUI parts for performing various operations for display on a display apparatus which is an apparatus of an output destination (swap, flip, color adjustment, contrast adjustment and switching between two dimensional (2D) display and three dimensional (3D) display) are provided. The user can operate the display of the display apparatus by suitably selecting any of the GUI parts.

It is to be noted that the operation screen image to be displayed on the centralized operation panel 5111 is not limited to the depicted example, and the user may be able to perform operation inputting to each apparatus which can be controlled by the audiovisual controller 5107 and the surgery room controlling apparatus 5109 provided in the surgery room system 5100 through the centralized operation panel 5111.

Figure 10:
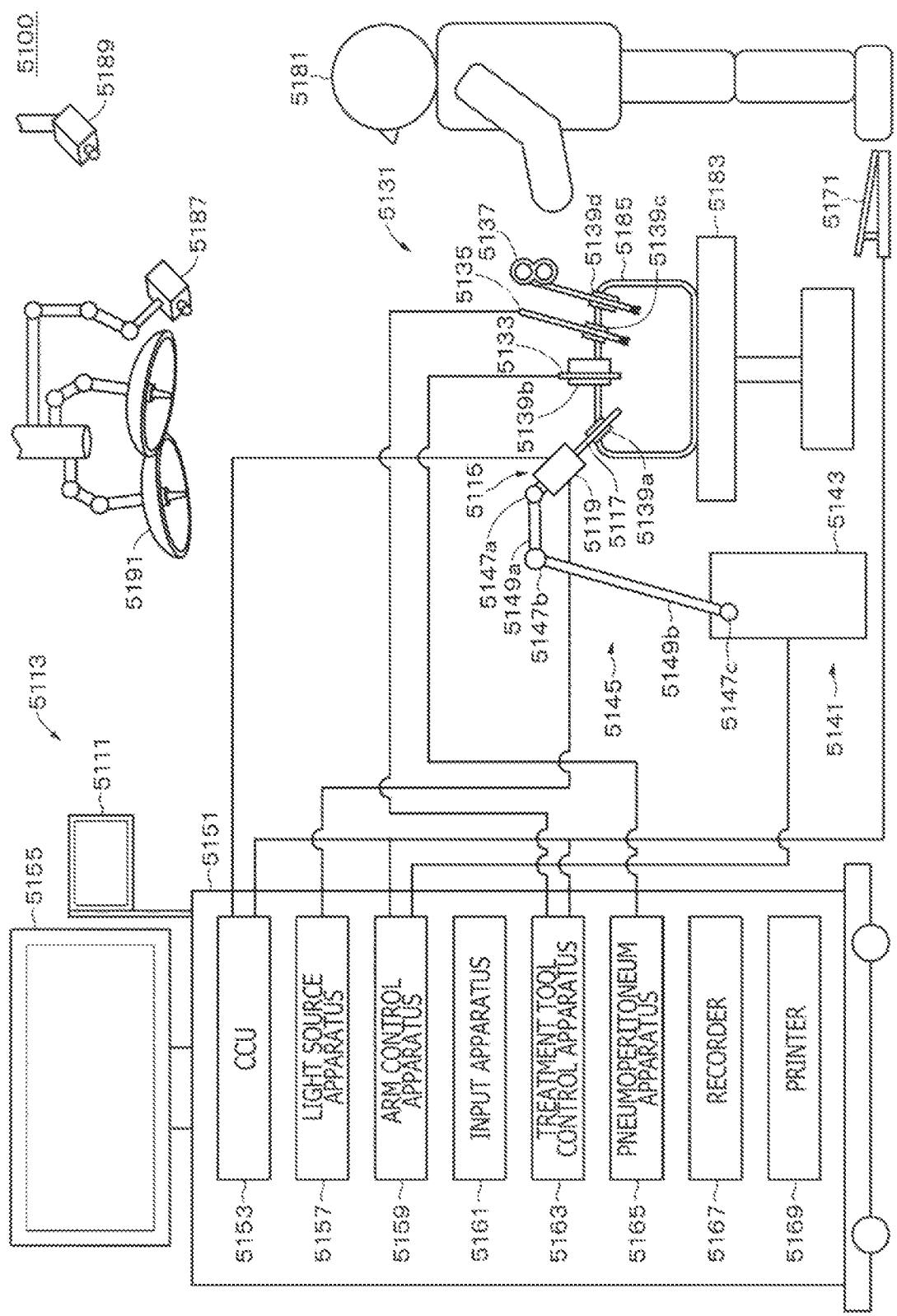
FIG. 10 is a view illustrating an example of a state of surgery to which the surgery room system is applied.

FIG. 10 is a view illustrating an example of a state of surgery to which the surgery room system described above is applied. The ceiling camera 5187 and the surgery field camera 5189 are provided on the ceiling of the surgery room such that it can image the hands of a surgeon (medical doctor) 5181 who performs treatment for an affected area of a patient 5185 on the patient bed 5183 and the entire surgery room. The ceiling camera 5187 and the surgery field camera 5189 may include a magnification adjustment function, a focal distance adjustment function, an imaging direction adjustment function and so forth. The illumination 5191 is provided on the ceiling of the surgery room and irradiates at least upon the hands of the surgeon 5181. The illumination

5191 may be configured such that the irradiation light amount, the wavelength (color) of the irradiation light, the irradiation direction of the light and so forth can be adjusted suitably.

The endoscopic surgery system 5113, the patient bed 5183, the ceiling camera 5187, the surgery field camera 5189 and the illumination 5191 are connected for cooperation with each other through the audiovisual controller 5107 and the surgery room controlling apparatus 5109 (not depicted in FIG. 10) as depicted in FIG. 8. The centralized operation panel 5111 is provided in the surgery room, and the user can suitably operate the apparatus existing in the surgery room through the centralized operation panel 5111 as described hereinabove.

In the following, a configuration of the endoscopic surgery system 5113 is described in detail. As depicted, the endoscopic surgery system 5113 includes an endoscope 5115, other surgical tools 5131, a supporting arm apparatus 5141 which supports the endoscope 5115 thereon, and a cart 5151 on which various apparatus for endoscopic surgery are mounted.

In endoscopic surgery, in place of incision of the abdominal wall to perform laparotomy, a plurality of tubular aperture devices called trocars 5139a to 5139d are used to puncture the abdominal wall. Then, a lens barrel 5117 of the endoscope 5115 and the other surgical tools 5131 are inserted into body lumens of the patient 5185 through the trocars 5139a to 5139d. In the example depicted, as the other surgical tools 5131, a pneumoperitoneum tube 5133, an energy treatment tool 5135 and forceps 5137 are inserted into body lumens of the patient 5185. Further, the energy treatment tool 5135 is a treatment tool for performing incision and peeling of a tissue, sealing of a blood vessel or the like by high frequency current or ultrasonic vibration. However, the surgical tools 5131 depicted are mere examples at all, and as the surgical tools 5131, various surgical tools which are generally used in endoscopic surgery such as, for example, a pair of tweezers or a retractor may be used.

An image of a surgical region in a body lumen of the patient 5185 picked up by the endoscope 5115 is displayed on a display apparatus 5155. The surgeon 5181 would use the energy treatment tool 5135 or the forceps 5137 while watching the image of the surgical region displayed on the display apparatus 5155 on the real time basis to perform such treatment as, for example, resection of an affected area. It is to be noted that, though not depicted, the pneumoperitoneum tube 5133, the energy treatment tool 5135, and the forceps 5137 are supported by the surgeon 5181, an assistant or the like during surgery.

(Supporting Arm Apparatus)

The supporting arm apparatus 5141 includes an arm unit 5145 extending from a base unit 5143. In the example depicted, the arm unit 5145 includes joint portions 5147a, 5147b and 5147c and links 5149a and 5149b and is driven under the control of an arm controlling apparatus 5159. The endoscope 5115 is supported by the arm unit 5145 such that the position and the posture of the endoscope 5115 are controlled. Consequently, stable fixation in position of the endoscope 5115 can be implemented.

(Endoscope)

The endoscope 5115 includes the lens barrel 5117 which has a region of a predetermined length from a distal end thereof to be inserted into a body lumen of the patient 5185, and a camera head 5119 connected to a proximal end of the lens barrel 5117. In the example depicted, the endoscope 5115 is depicted which is configured as a hard mirror having the lens barrel 5117 of the hard type. However, the endoscope 5115 may otherwise be configured as a soft mirror having the lens barrel 5117 of the soft type.

The lens barrel 5117 has, at a distal end thereof, an opening in which an objective lens is fitted. A light source apparatus 5157 is connected to the endoscope 5115 such that light generated by the light source apparatus 5157 is introduced to a distal end of the lens barrel 5117 by a light guide extending in the inside of the lens barrel 5117 and is applied toward an observation target in a body lumen of the patient 5185 through the objective lens. It is to be noted that the endoscope 5115 may be a direct view mirror or may be a perspective view mirror or a side view mirror.

An optical system and an image pickup element are provided in the inside of the camera head 5119 such that reflected light (observation light) from an observation target is condensed on the image pickup element by the optical system. The observation light is photo-electrically converted by the image pickup element to generate an electric signal corresponding to the observation light, namely, an image signal corresponding to an observation image. The image signal is transmitted as RAW data to a CCU 5153. It is to be noted that the camera head 5119 has a function incorporated therein for suitably driving the optical system of the camera head 5119 to adjust the magnification and the focal distance.

It is to be noted that, in order to establish compatibility with, for example, a stereoscopic vision (3D display), a plurality of image pickup elements may be provided on the camera head 5119. In this case, a plurality of relay optical systems are provided in the inside of the lens barrel 5117 in order to guide observation light to the plurality of respective image pickup elements.

(Various Apparatus Incorporated in Cart)

The CCU 5153 includes a central processing unit (CPU), a graphics processing unit (GPU) or the like and integrally controls operation of the endoscope 5115 and the display apparatus 5155. Specifically, the CCU 5153 performs, for an image signal received from the camera head 5119, various image processes for displaying an image based on the image signal such as, for example, a development process (demosaic process). The CCU 5153 provides the image signal for which the image processes have been performed to the display apparatus 5155. Further, the audiovisual controller 5107 depicted in FIG. 8 is connected to the CCU 5153. The CCU 5153 provides the image signal for which the image processes have been performed also to the audiovisual controller 5107. Further, the CCU 5153 transmits a control signal to the camera head 5119 to control driving of the camera head 5119. The control signal may include information relating to an image pickup condition such as a magnification or a focal distance. The information relating to an image pickup condition may be inputted through the inputting apparatus 5161 or may be inputted through the centralized operation panel 5111 described hereinabove.

The display apparatus 5155 displays an image based on an image signal for which the image processes have been performed by the CCU 5153 under the control of the CCU 5153. If the endoscope 5115 is ready for imaging of a high resolution such as 4K (horizontal pixel number 3840× vertical pixel number 2160), 8K (horizontal pixel number 7680×vertical pixel number 4320) or the like and/or ready for 3D display, then a display apparatus by which corresponding display of the high resolution and/or 3D display are possible may be used as the display apparatus 5155. Where the apparatus is ready for imaging of a high resolution such as 4K or 8K, if the display apparatus used as the display apparatus 5155 has a size of equal to or not less than 55 inches, then a more immersive experience can be obtained. Further, a plurality of display apparatus 5155 having different resolutions and/or different sizes may be provided in accordance with purposes.

The light source apparatus 5157 includes a light source such as, for example, a light emitting diode (LED) and supplies irradiation light for imaging of a surgical region to the endoscope 5115.

The arm controlling apparatus 5159 includes a processor such as, for example, a CPU and operates in accordance with a predetermined program to control driving of the arm unit 5145 of the supporting arm apparatus 5141 in accordance with a predetermined controlling method.

An inputting apparatus 5161 is an input interface for the endoscopic surgery system 5113. A user can perform inputting of various kinds of information or instruction inputting to the endoscopic surgery system 5113 through the inputting apparatus 5161. For example, the user would input various kinds of information relating to surgery such as physical information of a patient, information regarding a surgical procedure of the surgery and so forth through the inputting apparatus 5161. Further, the user would input, for example, an instruction to drive the arm unit 5145, an instruction to change an image pickup condition (type of irradiation light, magnification, focal distance or the like) by the endoscope 5115, an instruction to drive the energy treatment tool 5135 or a like through the inputting apparatus 5161.

The type of the inputting apparatus 5161 is not limited and may be that of any one of various known inputting apparatus. As the inputting apparatus 5161, for example, a mouse, a keyboard, a touch panel, a switch, a foot switch 5171 and/or a lever or the like may be applied. Where a touch panel is used as the inputting apparatus 5161, it may be provided on the display face of the display apparatus 5155.

The inputting apparatus 5161 is otherwise a device to be mounted on a user such as, for example, a glasses type wearable device or a head mounted display (HMD), and various kinds of inputting are performed in response to a gesture or a line of sight of the user detected by any of the devices mentioned. Further, the inputting apparatus 5161 includes a camera which can detect a motion of a user, and various kinds of inputting are performed in response to a gesture or a line of sight of a user detected from a video picked up by the camera. Further, the inputting apparatus 5161 includes a microphone which can collect the voice of a user, and various kinds of inputting are performed by voice through the microphone. By configuring the inputting apparatus 5161 such that various kinds of information can be inputted in a contactless fashion in this manner, especially a user who belongs to a clean area (for example, the surgeon 5181) can operate an apparatus belonging to an unclean area in a contactless fashion. Further, since the user can operate an apparatus without releasing a possessed surgical tool from its hand, the convenience to the user is improved.

A treatment tool controlling apparatus 5163 controls driving of the energy treatment tool 5135 for cautery or incision of a tissue, sealing of a blood vessel or the like. A pneumoperitoneum apparatus 5165 feeds gas into a body lumen of the patient 5185 through the pneumoperitoneum tube 5133 to inflate the body lumen in order to secure the field of view of the endoscope 5115 and secure the working space for the surgeon. A recorder 5167 is an apparatus capable of recording various kinds of information relating to surgery. A printer 5169 is an apparatus capable of printing various kinds of information relating to surgery in various forms such as a text, an image or a graph.

In the following, especially a characteristic configuration of the endoscopic surgery system 5113 is described in more detail.

(Supporting Arm Apparatus)

The supporting arm apparatus 5141 includes the base unit 5143 serving as a base, and the arm unit 5145 extending from the base unit 5143. In the example depicted, the arm unit 5145 includes the plurality of joint portions 5147a, 5147b and 5147c and the plurality of links 5149a and 5149b connected to each other by the joint portion 5147b. In FIG. 10, for simplified illustration, the configuration of the arm unit 5145 is depicted in a simplified form. Actually, the shape, number and arrangement of the joint portions 5147a to 5147c and the links 5149a and 5149b and the direction and so forth of axes of rotation of the joint portions 5147a to 5147c can be set suitably such that the arm unit 5145 has a desired degree of freedom. For example, the arm unit 5145 may preferably be included such that it has a degree of freedom equal to or not less than 6 degrees of freedom. This makes it possible to move the endoscope 5115 freely within the movable range of the arm unit 5145. Consequently, it becomes possible to insert the lens barrel 5117 of the endoscope 5115 from a desired direction into a body lumen of the patient 5185.

An actuator is provided in the joint portions 5147a to 5147c, and the joint portions 5147a to 5147c include such that they are rotatable around predetermined axes of rotation thereof by driving of the actuator. The driving of the actuator is controlled by the arm controlling apparatus 5159 to control the rotational angle of each of the joint portions 5147a to 5147c thereby to control driving of the arm unit 5145. Consequently, control of the position and the posture of the endoscope 5115 can be implemented. Thereupon, the arm controlling apparatus 5159 can control driving of the arm unit 5145 by various known controlling methods such as force control or position control.

For example, if the surgeon 5181 suitably performs operation inputting through the inputting apparatus 5161 (including the foot switch 5171), then driving of the arm unit 5145 may be controlled suitably by the arm controlling apparatus 5159 in response to the operation input to control the position and the posture of the endoscope 5115. After the endoscope 5115 at the distal end of the arm unit 5145 is moved from an arbitrary position to a different arbitrary position by the control just described, the endoscope 5115 can be supported fixedly at the position after the movement. It is to be noted that the arm unit 5145 may be operated in a master-slave fashion. In this case, the arm unit 5145 may be remotely controlled by the user through the inputting apparatus 5161 which is placed at a place remote from the surgery room.

Further, where force control is applied, the arm controlling apparatus 5159 may perform power-assisted control to drive the actuators of the joint portions 5147a to 5147c such that the arm unit 5145 may receive external force by the user and move smoothly following the external force. This makes it possible to move the arm unit 5145 with comparatively weak force when the user directly touches with and moves the arm unit 5145. Accordingly, it becomes possible for the user to move the endoscope 5115 more intuitively by a simpler and easier operation, and the convenience to the user can be improved.

Here, generally in endoscopic surgery, the endoscope 5115 is supported by a medical doctor called scopist. In contrast, where the supporting arm apparatus 5141 is used, the position of the endoscope 5115 can be fixed with a higher degree of certainty without hands, and therefore, an image of a surgical region can be obtained stably and surgery can be performed smoothly.

It is to be noted that the arm controlling apparatus 5159 may not necessarily be provided on the cart 5151. Further, the arm controlling apparatus 5159 may not necessarily be a single apparatus. For example, the arm controlling apparatus 5159 may be provided in each of the joint portions 5147a to 5147c of the arm unit 5145 of the supporting arm apparatus 5141 such that the plurality of arm controlling apparatus 5159 cooperate with each other to implement driving control of the arm unit 5145.

(Light Source Apparatus)

The light source apparatus 5157 supplies irradiation light upon imaging of a surgical region to the endoscope 5115. The light source apparatus 5157 includes a white light source which includes, for example, an LED, a laser light source or a combination of them. In this case, where a white light source includes a combination of red, green, and blue (RGB) laser light sources, since the output intensity and the output timing can be controlled with a high degree of accuracy for each color (each wavelength), adjustment of the white balance of a picked up image can be performed by the light source apparatus 5157. Further, in this case, if laser beams from the RGB laser light sources are applied time-divisionally on an observation target and driving of the image pickup elements of the camera head 5119 is controlled in synchronism with the irradiation timings, then images individually corresponding to the R, G and B colors can be picked up time-divisionally. According to the method just described, a color image can be obtained even if a color filter is not provided for the image pickup element.

Further, driving of the light source apparatus 5157 may be controlled such that the intensity of light to be outputted is changed for each predetermined time. By controlling driving of the image pickup element of the camera head 5119 in synchronism with the timing of the change of the intensity of light to acquire images time-divisionally and synthesizing the images, an image of a high dynamic range free from underexposed blocked up shadows and overexposed highlights can be created.

Further, the light source apparatus 5157 may be configured to supply light of a predetermined wavelength band ready for special light observation. In special light observation, for example, by utilizing the wavelength dependency of absorption of light of a body tissue, narrow band light observation (narrow band imaging) of imaging a predetermined tissue such as a blood vessel of a superficial portion of the mucous membrane or the like in a high contrast is performed by applying light of a narrower band in comparison with irradiation light upon ordinary observation (namely, white light). Alternatively, in special light observation, fluorescent observation for obtaining an image from fluorescent light generated by irradiation of excitation light may also be performed. In fluorescent observation, it is possible to perform observation of fluorescent light from a body tissue by irradiating excitation light on the body tissue (autofluorescence observation) or to obtain a fluorescent light image by locally injecting a reagent such as indocyanine green (ICG) into a body tissue and irradiating excitation light corresponding to a fluorescent light wavelength of the reagent upon the body tissue. The light source apparatus 5157 can be configured to supply such narrow-band light and/or excitation light suitable for special light observation as described above.

(Camera Head and CCU)

Figure 11:
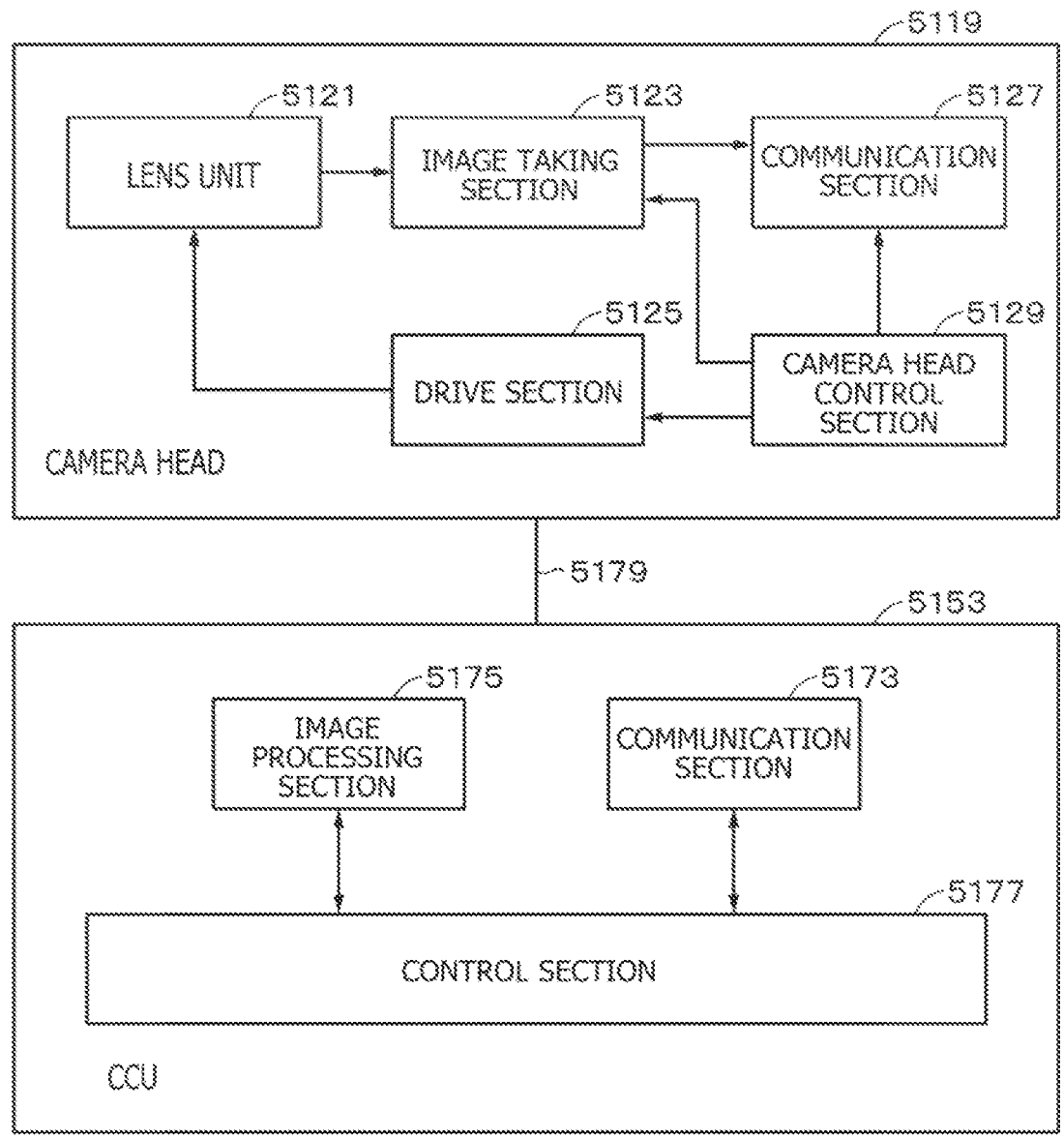
FIG. 11 is a block diagram depicting an example of a functional configuration of a camera head and a camera control unit (CCU) depicted in FIG. 10.

Functions of the camera head 5119 of the endoscope 5115 and the CCU 5153 are described in more detail with reference to FIG. 11. FIG. 11 is a block diagram depicting an example of a functional configuration of the camera head 5119 and the CCU 5153 depicted in FIG. 10.

Referring to FIG. 11, the camera head 5119 has, as functions thereof, a lens unit 5121, an image pickup unit 5123, a driving unit 5125, a communication unit 5127 and a camera head controlling unit 5129. Further, the CCU 5153 has, as functions thereof, a communication unit 5173, an image processing unit 5175 and a control unit 5177. The camera head 5119 and the CCU 5153 are connected to be bidirectionally communicable to each other by a transmission cable 5179.

First, a functional configuration of the camera head 5119 is described. The lens unit 5121 is an optical system provided at a connecting location of the camera head 5119 to the lens barrel 5117. Observation light taken in from a distal end of the lens barrel 5117 is introduced into the camera head 5119 and enters the lens unit 5121. The lens unit 5121 includes a combination of a plurality of lenses including a zoom lens and a focusing lens. The lens unit 5121 has optical properties adjusted such that the observation light is condensed on a light receiving face of the image pickup element of the image pickup unit 5123. Further, the zoom lens and the focusing lens include such that the positions thereof on their optical axis are movable for adjustment of the magnification and the focal point of a picked up image.

The image pickup unit 5123 includes an image pickup element and disposed at a succeeding stage to the lens unit 5121. Observation light having passed through the lens unit 5121 is condensed on the light receiving face of the image pickup element, and an image signal corresponding to the observation image is generated by photoelectric conversion. The image signal generated by the image pickup unit 5123 is provided to the communication unit 5127.

As the image pickup element which is included by the image pickup unit 5123, an image sensor, for example, of the complementary metal oxide semiconductor (CMOS) type is used which has a Bayer array and is capable of picking up an image in color. It is to be noted that, as the image pickup element, an image pickup element may be used which is ready, for example, for imaging of an image of a high resolution equal to or not less than 4K. If an image of a surgical region is obtained in a high resolution, then the surgeon 5181 can comprehend a state of the surgical region in enhanced details and can proceed with the surgery more smoothly.

Further, the image pickup element which is included by the image pickup unit 5123 is configured such that it has a pair of image pickup elements for acquiring image signals for the right eye and the left eye compatible with 3D display. Where 3D display is applied, the surgeon 5181 can comprehend the depth of a living body tissue in the surgical region with a higher degree of accuracy. It is to be noted that, if the image pickup unit 5123 is configured as that of the multi-plate type, then a plurality of systems of lens units 5121 are provided corresponding to the individual image pickup elements of the image pickup unit 5123.

The image pickup unit 5123 may not necessarily be provided on the camera head 5119. For example, the image pickup unit 5123 may be provided just behind the objective lens in the inside of the lens barrel 5117.

The driving unit 5125 includes an actuator and moves the zoom lens and the focusing lens of the lens unit 5121 by a predetermined distance along the optical axis under the control of the camera head controlling unit 5129. Consequently, the magnification and the focal point of a picked up image by the image pickup unit 5123 can be adjusted suitably.

The communication unit 5127 includes a communication apparatus for transmitting and receiving various kinds of information to and from the CCU 5153. The communication unit 5127 transmits an image signal acquired from the image pickup unit 5123 as RAW data to the CCU 5153 through the transmission cable 5179. Thereupon, in order to display a picked up image of a surgical region in low latency, preferably the image signal is transmitted by optical communication. This is because, since, upon surgery, the surgeon 5181 performs surgery while observing the state of an affected area through a picked up image, in order to achieve surgery with a higher degree of safety and certainty, it is demanded for a moving image of the surgical region to be displayed on the real time basis as far as possible. Where optical communication is applied, a photoelectric conversion module for converting an electric signal into an optical signal is provided in the communication unit 5127. After the image signal is converted into an optical signal by the photoelectric conversion module, it is transmitted to the CCU 5153 through the transmission cable 5179.

Further, the communication unit 5127 receives a control signal for controlling driving of the camera head 5119 from the CCU 5153. The control signal includes information relating to image pickup conditions such as, for example, information that a frame rate of a picked up image is designated, information that an exposure value upon image picking up is designated and/or information that a magnification and a focal point of a picked up image are designated. The communication unit 5127 provides the received control signal to the camera head controlling unit 5129. It is to be noted that also the control signal from the CCU 5153 may be transmitted by optical communication. In this case, a photoelectric conversion module for converting an optical signal into an electric signal is provided in the communication unit 5127. After the control signal is converted into an electric signal by the photoelectric conversion module, it is provided to the camera head controlling unit 5129.

It is to be noted that the image pickup conditions such as the frame rate, exposure value, magnification or focal point are set automatically by the control unit 5177 of the CCU 5153 on the basis of an acquired image signal. In other words, an auto exposure (AE) function, an auto focus (AF) function and an auto white balance (AWB) function are incorporated in the endoscope 5115.

The camera head controlling unit 5129 controls driving of the camera head 5119 on the basis of a control signal from the CCU 5153 received through the communication unit 5127. For example, the camera head controlling unit 5129 controls driving of the image pickup element of the image pickup unit 5123 on the basis of information that a frame rate of a picked up image is designated and/or information that an exposure value upon image picking up is designated. Further, for example, the camera head controlling unit 5129 controls the driving unit 5125 to suitably move the zoom lens and the focus lens of the lens unit 5121 on the basis of information that a magnification and a focal point of a picked up image are designated. The camera head controlling unit 5129 may include a function for storing information for identifying of the lens barrel 5117 and/or the camera head 5119.

It is to be noted that, by disposing the components such as the lens unit 5121 and the image pickup unit 5123 in a sealed structure having high airtightness and high waterproof, the camera head 5119 can be provided with resistance to an autoclave sterilization process.

Now, a functional configuration of the CCU 5153 is described. The communication unit 5173 includes a communication apparatus for transmitting and receiving various kinds of information to and from the camera head 5119. The communication unit 5173 receives an image signal transmitted thereto from the camera head 5119 through the transmission cable 5179. Thereupon, the image signal may be transmitted preferably by optical communication as described above. In this case, for the compatibility with optical communication, the communication unit 5173 includes a photoelectric conversion module for converting an optical signal into an electric signal. The communication unit 5173 provides the image signal after conversion into an electric signal to the image processing unit 5175.

Further, the communication unit 5173 transmits, to the camera head 5119, a control signal for controlling driving of the camera head 5119. Also the control signal may be transmitted by optical communication.

The image processing unit 5175 performs various image processes for an image signal in the form of RAW data transmitted thereto from the camera head 5119. The image processes include various known signal processes such as, for example, a development process, an image quality improving process (a bandwidth enhancement process, a super-resolution process, a noise reduction (NR) process and/or an image stabilization process) and/or an enlargement process (electronic zooming process). Further, the image processing unit 5175 performs a detection process for an image signal for performing AE, AF and AWB.

The image processing unit 5175 includes a processor such as a CPU or a GPU, and when the processor operates in accordance with a predetermined program, the image processes and the detection process described above can be performed. It is to be noted that, where the image processing unit 5175 includes a plurality of GPUs, the image processing unit 5175 suitably divides information relating to an image signal such that image processes are performed in parallel by the plurality of GPUs.

The control unit 5177 performs various kinds of control relating to image picking up of a surgical region by the endoscope 5115 and display of the picked up image. For example, the control unit 5177 generates a control signal for controlling driving of the camera head 5119. Thereupon, if image pickup conditions are inputted by the user, then the control unit 5177 generates a control signal on the basis of the input by the user. Alternatively, where the endoscope 5115 has an AE function, an AF function and an AWB function incorporated therein, the control unit 5177 suitably calculates an optimum exposure value, focal distance and white balance in response to a result of a detection process by the image processing unit 5175 and generates a control signal.

Further, the control unit 5177 controls the display apparatus 5155 to display an image of a surgical region on the basis of an image signal for which the image processes have been performed by the image processing unit 5175. Thereupon, the control unit 5177 recognizes various objects in the surgical region image using various image recognition technologies. For example, the control unit 5177 can recognize a surgical tool such as forceps, a particular living body region, bleeding, mist when the energy treatment tool 5135 is used and so forth by detecting the shape, color and so forth of edges of the objects included in the surgical region image. The control unit 5177 causes, when it controls the display apparatus 5155 to display a surgical region image, various kinds of surgery supporting information to be displayed in an overlapping manner with an image of the surgical region using a result of the recognition. Where surgery supporting information is displayed in an overlapping manner and presented to the surgeon 5181, the surgeon 5181 can proceed with the surgery more safety and certainty.

The transmission cable 5179 which connects the camera head 5119 and the CCU 5153 to each other is an electric signal cable ready for communication of an electric signal, an optical fiber ready for optical communication or a composite cable thereof.

Here, while, in the example depicted in the figure, communication is performed by wired communication using the transmission cable 5179, the communication between the camera head 5119 and the CCU 5153 may be performed otherwise by wireless communication. Where the communication between the camera head 5119 and the CCU 5153 is performed by wireless communication, there is no necessity to lay the transmission cable 5179 in the surgery room. Therefore, such a situation that movement of medical staff in the surgery room is disturbed by the transmission cable 5179 can be eliminated.

An example of the surgery room system 5100 to which the technology according to an embodiment of the present disclosure can be applied has been described above. It is to be noted here that, although a case in which the medical system to which the surgery room system 5100 is applied is the endoscopic surgery system 5113 has been described as an example, the configuration of the surgery room system 5100 is not limited to that of the example described above. For example, the surgery room system 5100 may be applied to a soft endoscopic system for inspection or a microscopic surgery system in place of the endoscopic surgery system 5113.

Of the application examples described above, the technology related with the present disclosure is usable in transferring a surgical operation video taken during a surgical operation to a personal computer, a tablet terminal, or a monitor arranged in another room and tagging the transferred video.

3. Examples of Variations

The embodiments of the present technology have been specifically described above. It should be noted however that the present technology is not limited to the embodiments described above; namely, variations based on the technical concept of the present technology are practicable.

The display regions to be displayed on the display section 240 are not limited to the first display region 110 and the second display region 120. Three or more display regions may be displayed on the display section 240 in a range in which a user who executes tagging is able to handle these display regions, thereby displaying two or more videos having different delay times.

A video to be displayed in the first display region 110 is not limited to a real-time video. Recorded video content may be displayed in the first display region 110 so as to display this recorded video content in the second display region 120 by delaying this content by a predetermined time.

Figure 12:
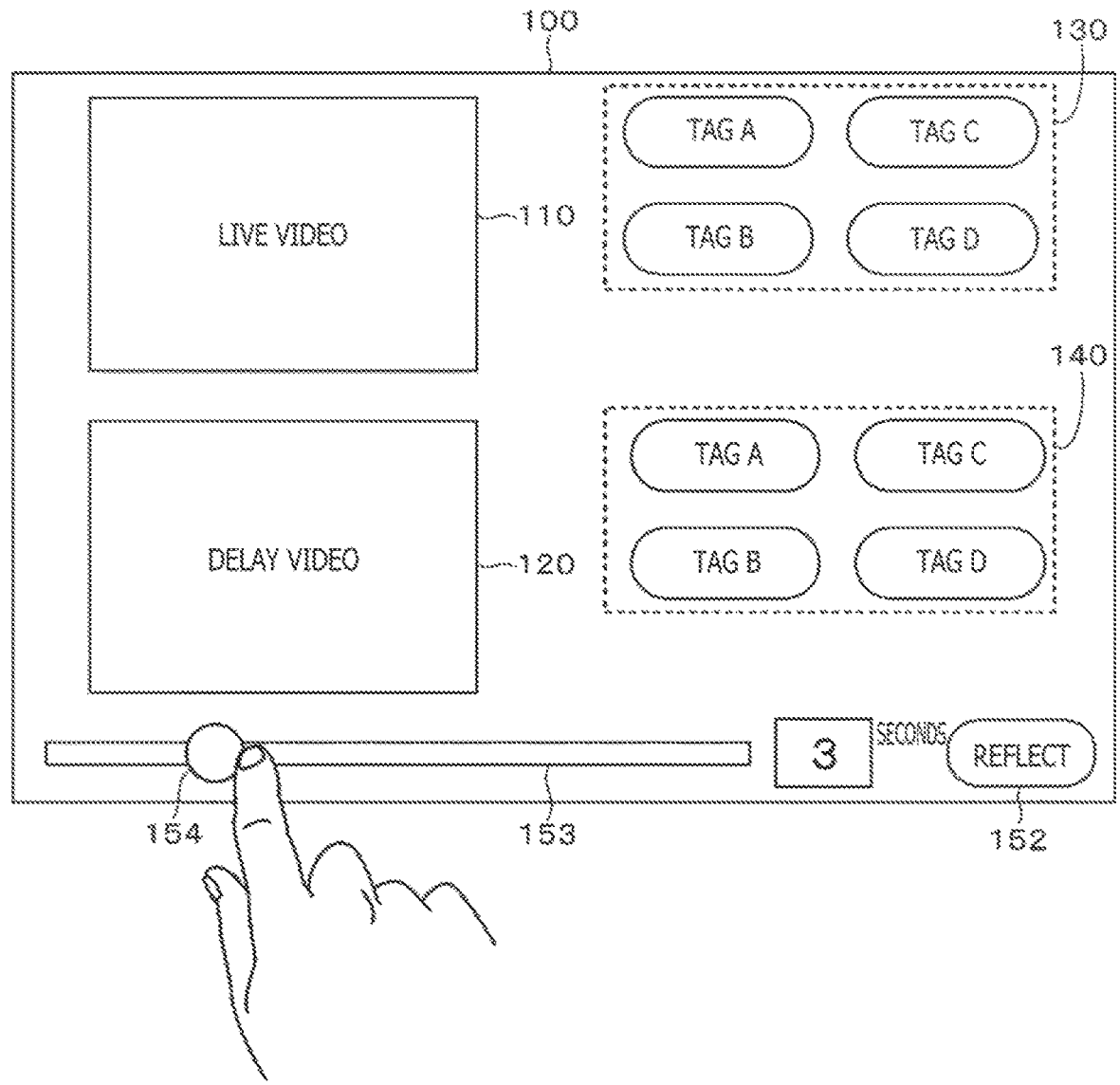
FIG. 12 is a diagram illustrating a configuration of a user interface related with a variation.

As illustrated in FIG. 12, the delay time input section 150 may be configured by a slide bar 153 and an icon 154 that moves on the slide bar 153 in accordance with user's finger contact or the like, the icon 154 being displayed on the slide bar 153. A configuration in which the position of the icon on the slide bar is related with delay time and sliding the icon to the right increases delay time while sliding the icon to the left decrease delay time, for example, allows the user to adjust delay time more intuitively.

Further, the delay time input section 150 may be of a form in which delay time is electively inputted through a pull-down menu or configured so as to input specific numerals indicative of delay time by displaying a software keyboard.

It is also practicable to display the first display region 110 and the first tag input section 130 on a first display device connected to the terminal apparatus 200 and the second display region 120 and the second tag input section 140 on a second display device displayed on the terminal apparatus 200, thereby providing a so-called dual display. Further, it is practicable to display the first display region 110 on a display section of a first terminal apparatus and the second display region 120 on a second terminal apparatus different from the first terminal apparatus, thereby allowing two or more users to execute tagging on the videos thereof.

It is also practicable to display the user interface 100 on a display section of an image taking apparatus (a consumer digital video camera, a business video camera, or the like) being used by a camera person taking images, thereby allowing the camera person to execute tag input while taking images.

In the embodiment, the number of tag input buttons of the first tag input section 130 and the number of tag input buttons of the second tag input section 140 are identical; however, the number of tag input buttons of the first tag input section 130 and the number of tag input buttons of second tag input section 140, namely, the number of tag types, may be different. For example, only a button for inputting an especially important tag may be displayed on the second tag input section 140 corresponding to a delay video.

The user may input a tag in an audio manner. In this case, it is required for a user to utter corresponding specific words to a first video and a second video so as to make distinction whether a tag to be inputted is for the first video or for the second video, utter the words while inputting in a hardware input apparatus, and so on. In addition, the tag input by a user may be executed in a manner in which tags to be inputted are selected from a list.

The application of the present technology is not limited to video content; for example, the present technology is applicable to any content that changes with the progression of time, such as an image slide show, for example.

The present technology can also take the following configuration.

(1)

An information processing apparatus including:

displaying video content on a first display region in a display section as a first video;

displaying the above-mentioned video content on a second display region in the above-mentioned display section as a second video delayed from the above-mentioned first video by a predetermined time; and setting a first tag inputted by a user into the above-mentioned first video and a second tag inputted by the above-mentioned user into the above-mentioned second video as tags for the above-mentioned video content.

(2)

The information processing apparatus according to (1) above, in which the above-mentioned first tag is related with time information indicative of a degree of progression of the above-mentioned video content so as to be registered as a tag for the above-mentioned video content.

(3)

The information processing apparatus according to (2) above, in which the above-mentioned second tag is registered for the above-mentioned video content with the above-mentioned delay time subtracted from time indicated by the above-mentioned time information.

(4)

The information processing apparatus according to any one of (1) through (3) above, in which the above-mentioned delay time for the above-mentioned second video to the above-mentioned first video is set in accordance with an input from the above-mentioned user.

(5)

The information processing apparatus according to any one of (1) through (4) above, in which a first tag input section configured to accept a tag input from a user for the above-mentioned first video and a second tag input section configured to accept a tag input from a user for the above-mentioned second video are displayed on the above-mentioned displayed section.

(6)

The information processing apparatus according to (5) above, in which the above-mentioned first tag input section and the above-mentioned second tag input section include each one or a plurality of tag input buttons.

(7)

The information processing apparatus according to (6) above in which, if the above-mentioned first tag and the above-mentioned second tag that are same in type to each other, and are within a predetermined time range, then the above-mentioned second tag is prioritized.

(8)

The information processing apparatus according to (6) above in which, if the above-mentioned first tag and the above-mentioned second tag that are same in type to each other, and are within a predetermined time range, then a new tag is generated from time information related with the above-mentioned first tag and time information related with the above-mentioned second tag.

(9)

The information processing apparatus according to any one of (1) through (8) above, in which the above-mentioned first video is a live video with the above-mentioned video content displayed in real time.

(10)

An information processing method including:

displaying video content on a first display region in a display section as a first video;

displaying the above-mentioned video content on a second display region in the above-mentioned display section as a second video delayed from the above-mentioned first video by a predetermined time; and setting a first tag inputted by a user into the above-mentioned first video and a second tag inputted by the above-mentioned user into the above-mentioned second video as tags for the above-mentioned video content.

(11)

An information processing program for having a computer execute an information processing method including:

displaying video content on a first display region in a display section as a first video;

displaying the above-mentioned video content on a second display region in the above-mentioned display section as a second video delayed from the above-mentioned first video by a predetermined time; and setting a first tag inputted by a user into the above-mentioned first video and a second tag inputted by the above-mentioned user into the above-mentioned second video as tags for the above-mentioned video content.

REFERENCE SIGNS LIST

110 . . . First display region
120 . . . Second display region
240 . . . Display section
260 . . . Information processing section

The invention claimed is:

1. An information processing apparatus, comprising:
at least one processor configured to:
control display of a first video, wherein the first video is video content on a first display region of a first display section;
control display of a second video, wherein
the second video is the video content on a second display region of a second display section, and
the second video is delayed from the first video by a determined time; and
set a first tag inputted by at least one user into the first video and a second tag, having a type same as a type of the first tag, inputted separately from the first tag into the second video delayed from the first video as tags for the video content,
wherein the second tag is set based on the input into the second video different from the input into the first video.

2. The information processing apparatus according to claim 1, wherein the at least one processor is further configured to register the first tag for the video content based on time information indicative of a degree of progression of the video content.

3. The information processing apparatus according to claim 2, wherein the at least one processor is further configured to register the second tag for the video content with a delay time subtracted from a time indicated by the time information.

4. The information processing apparatus according to claim 1, wherein the at least one processor is further configured to set a delay time for the second video with respect to the first video based on a specific input from the at least one user.

5. The information processing apparatus according to claim 1, wherein
the at least one processor is further configured to control display of a first tag input section on the first display section and a second tag input section on the second display section,
the first tag input section is configured to accept a first tag input from the at least one user for the first video, and
the second tag input section is configured to accept a second tag input from the at least one user for the second video.

6. The information processing apparatus according to claim 5, wherein each of the first tag input section and the second tag input section includes at least one tag input button.

7. The information processing apparatus according to claim 6, wherein the at least one processor is further configured to prioritize the second tag in a case the type of the first tag is the same as the type of the second tag, and the second tag and the first tag are within a determined time range.

8. The information processing apparatus according to claim 6, wherein the at least one processor is further configured to:
control the display of the first video on the first display region of the first display section of a first display device; and
control the display of the second video on the second display region of the second display section of a second display device different from the first display device.

9. The information processing apparatus according to claim 6, wherein the at least one processor is further configured to set at least one tag for the video content based on the first tag and the second tag that are within a determined time range, in a case the type of the first tag is the same as the type of the second tag.

10. The information processing apparatus according to claim 6, wherein
the at least one processor is further configured to generate a new tag in a case the type of the first tag is the same as the type of the second tag, and the first tag and the second tag are within a determined time range, and
the generation of the new tag is based on time information related with the first tag and time information related with the second tag.

11. The information processing apparatus according to claim 1, wherein the first video is a live video with the video content displayed in real time.

12. The information processing apparatus according to claim 1, wherein the at least one processor is further configured to tag the video content based on the type of the first tag inputted into the first video that is the same as the type of the second tag inputted into the second video, in a case the first tag and the second tag are within a determined time range.

13. The information processing apparatus according to claim 1, wherein the at least one processor is further configured to set at least one of the first tag, the second tag, or a third tag related to the first tag and the second tag.

14. The information processing apparatus according to claim 1, wherein the at least one processor is further configured to cancel at least one of the first tag or the second tag.

15. The information processing apparatus according to claim 1, wherein
the at least one user includes a first user, and
the first tag is inputted by the first user into the first video.

16. The information processing apparatus according to claim 15, wherein
the at least one user further includes a second user, and
the second tag is inputted by the second user into the second video.

17. An information processing method, comprising:
displaying a first video, wherein the first video is video content on a first display region of a first display section;
displaying a second video, wherein
the second video is the video content on a second display region of a second display section, and
the second video is delayed from the first video by a determined time; and
setting a first tag inputted by at least one user into the first video and a second tag, having a type same as a type of the first tag, inputted separately from the first tag into the second video delayed from the first video as tags for the video content,
wherein the second tag is set based on the input into the second video different from the input into the first video.

18. A non-transitory computer-readable medium having stored thereon computer-executable instructions which, when executed by a computer, cause the computer to execute operations, the operations comprising:
displaying a first video, wherein the first video is video content on a first display region of a first display section;
displaying a second video, wherein
the second video is the video content on a second display region of a second display section, and
the second video is delayed from the first video by a determined time; and
setting a first tag inputted by at least one user into the first video and a second tag, having a type same as a type of the first tag, inputted separately from the first tag into the second video delayed from the first video as tags for the video content,
wherein the second tag is set based on the input into the second video different from the input into the first video.

19. An information processing apparatus, comprising:
at least one processor configured to:
control display of a first video, wherein the first video is video content on a first display region of a first display section;
control display of a second video, wherein
the second video is the video content on a second display region of a second display section, and
the second video is delayed from the first video by a determined time;
control display of a first tag input section on the first display section and a second tag input section on the second display section, wherein
the first tag input section is configured to accept input of a first tag from at least one user for the first video,
the second tag input section is configured to accept input of a second tag for the second video, and
each of the first tag input section and the second tag input section includes at least one tag input button;
set the first tag inputted by the at least one user into the first video and the second tag inputted into the second video as tags for the video content; and
prioritize the second tag in a case the first tag is the same as the second tag in type, and the second tag and the first tag are within a determined time range.

* * * * *